United States Patent [19]
Umekita et al.

[11] Patent Number: 5,289,586
[45] Date of Patent: Feb. 22, 1994

[54] DIGITAL INFORMATION TRANSMISSION APPARATUS AND METHOD OF DRIVING INFORMATION TRANSMISSION BUS SYSTEM THEREOF

[75] Inventors: Kazuhiro Umekita; Masatsugu Kametani, both of Ibaraki, Japan

[73] Assignee: Hitachi, Ltd., Tokyo, Japan

[21] Appl. No.: 935,339

[22] Filed: Aug. 27, 1992

Related U.S. Application Data

[63] Continuation of Ser. No. 438,013, Nov. 20, 1989.

[30] Foreign Application Priority Data

Nov. 29, 1988 [JP] Japan .................................. 63-301303

[51] Int. Cl.⁵ .............................................. G06F 13/42
[52] U.S. Cl. ............................. 395/325; 364/DIG. 1;
364/229.2; 364/239; 364/239.51; 364/240;
364/240.1
[58] Field of Search ................... 371/10.1; 340/825.5;
365/189.05; 395/200, 325

[56] References Cited

U.S. PATENT DOCUMENTS

| | | | |
|---|---|---|---|
| 3,755,789 | 8/1973 | Collins | 395/550 |
| 4,841,295 | 6/1989 | Delaney et al. | 340/825.5 |
| 4,860,333 | 8/1989 | Bitzinger et al. | 371/10.1 X |

*Primary Examiner*—Debra A. Chun
*Attorney, Agent, or Firm*—Antonelli, Terry, Stout & Kraus

[57] ABSTRACT

A digital information transmission apparatus and an information transmission bus system thereof capable of quickly stabilizing a signal on a bus. The apparatus outputs to a bus, in a bus cycle identical to a bus cycle in which a digital information input system reads desired digital information, information items identical to the desired digital information read by the digital information input system respectively from the buffers of at least two digital information output systems of a plurality of digital information output systems.

11 Claims, 17 Drawing Sheets

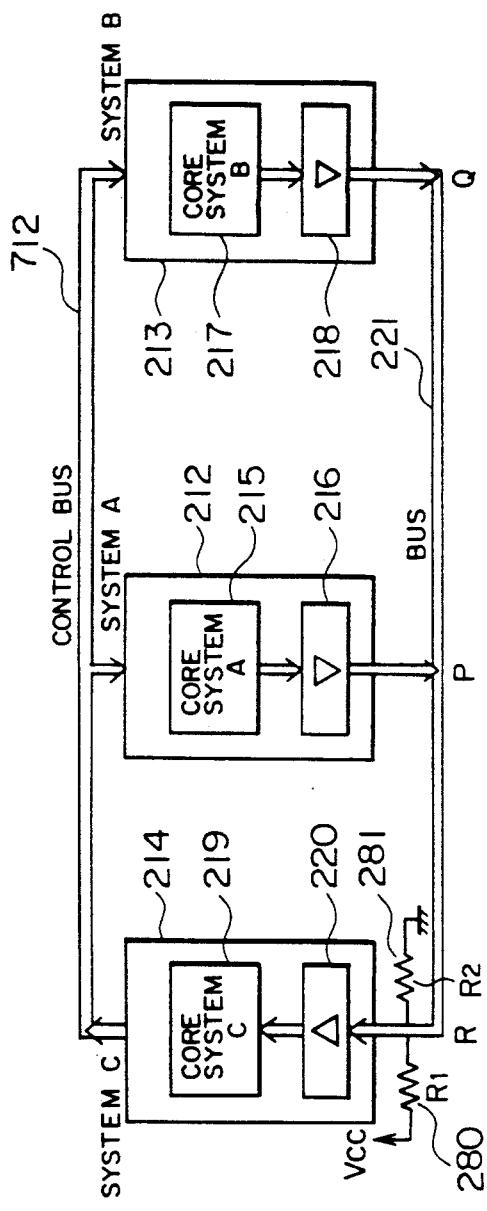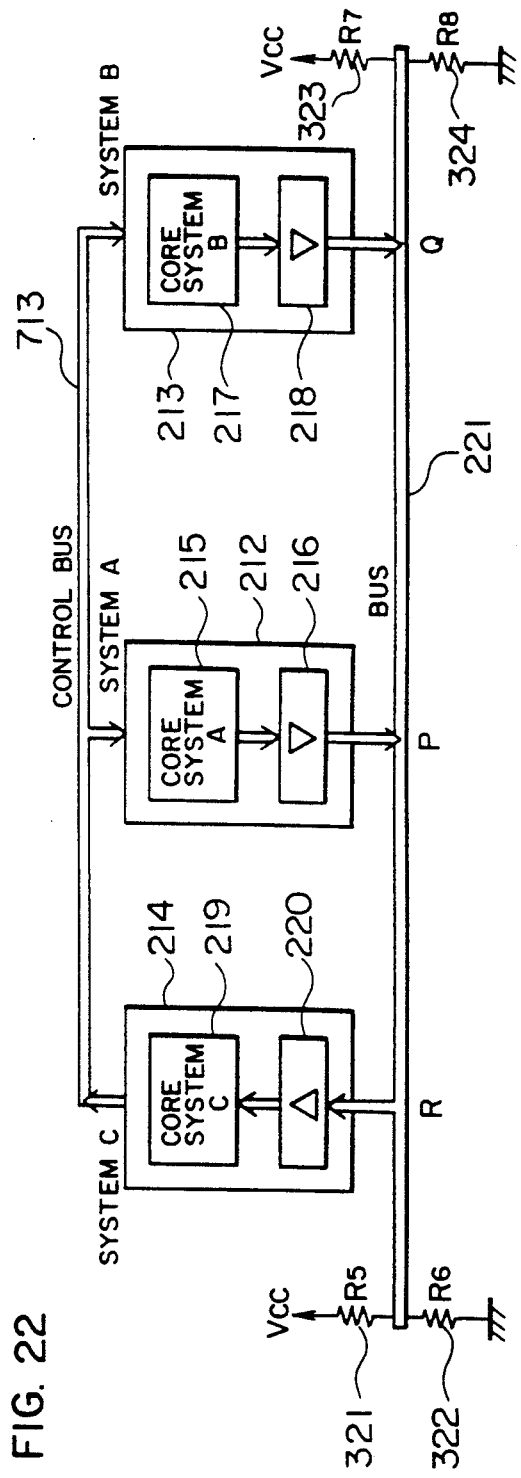
FIG. 21
FIG. 22

DIGITAL INFORMATION TRANSMISSION APPARATUS AND METHOD OF DRIVING INFORMATION TRANSMISSION BUS SYSTEM THEREOF

This application is a continuation of application Ser. No. 438,013, filed on Nov. 20, 1989.

FIELD OF THE INVENTION

The present invention relates to a digital information transmission apparatus and a method of driving a bus system for transmitting information thereof, and in particular, to a digital information transmission apparatus capable of accurately executing a digital information transmission even when a digital information transmission bus is driven at a high speed and to a method of driving a bus system for transmitting information of the apparatus.

BACKGROUND OF THE INVENTION

An electronic circuit includes in many cases devices having various functions so as to communicate digital information items between these devices. The digital information is usually transferred through a bus.

For example, in a case where a central processing unit (CPU) reads data from a memory or writes data in a memory by use of a data bus, if the CPU is operated at a high speed, the data setup time margin is reduced. In order to overcome this difficulty, it is necessary to stabilize and establish a signal on the data bus to a predetermined state as quickly as possible.

Particularly, when compared with the data write operation of the CPU into a memory, the data read operation from a memory requires the signal to be more quickly stabilized on the data bus. The reason therefor will be described with reference to FIGS. 25 and 26. FIG. 25 is a timing chart of signals employed when the CPU writes data in a memory system. In the figure, CLK denotes a clock signal. When a CPU write cycle is initiated, the CPU supplies an address (Address OUT) and data (DATA OUT) onto the bus.

Based on the address signal, a memory chip select signal $\overline{CS}$ (low active) and a memory write enable signal $\overline{WE}$ (low active) are produced so as to be delivered to the memory system. When the signals $\overline{CS}$ and $\overline{WE}$ are set to be active, the data on the bus is written in the memory system. When the CPU writes data in the memory system, a setup time of write data is determined with reference to a rising edge of the $\overline{WE}$ signal. In the timing chart of FIG. 25, Rtsu designates a period of time to be elapsed from when the data is inputted to the memory to when the $\overline{WE}$ signal rises.

FIG. 26 shows a timing chart of signals used when the CPU reads data from the memory system. In the figure, CLK indicates a clock signal.

When a CPU read cycle is started, the CPU outputs an address (Address OUT). Based on the address, a $\overline{CS}$ signal (low active) is produced so as to be inputted to the memory system. After the $\overline{CS}$ signal becomes active and when a memory access time Wtoe is elapsed, data (DATA OUT) is delivered from the memory. Thereafter, when an output enable signal $\overline{OE}$ (low active) is set to be active, the data sent from the memory is supplied onto the data bus s as to be inputted to the CPU (DATA IN).

In the CPU read cycle, the falling edge of the last CLK of the cycle is assumed as a reference of data setup time. In the chart of FIG. 26, Wtsu denotes a period of time from when the data is inputted to the CPU to when the clock signal CLK falls.

As can be seen from Rtsu of FIG. 25 and Wtsu of FIG. 26, there exists a relationship Rtsu > Wtsu. In consequence, when the operation speed of the CPU is increased, the CPU read operation first fails, before the CPU write operation, because a necessary data setup time cannot be obtained, which leads to a CPU read error. Moreover, due to occurrences of problems such as a signal reflection on the data bus, the period of Wtsu is further reduced when a period of time in which the data is stabilized on the data bus is taken into consideration. Namely, it is quite difficult to satisfy the condition of the data setup time necessary for the operation.

For the reasons above, in the memory read operation of the CPU, the signal on the data bus is required to be stabilized at a higher speed as compared with a case of the memory write operation of the CPU.

In the description above, it is assumed that a period of time from the falling edge of the CLK to the falling edge thereof is set as one cycle and the $\overline{CS}$, $\overline{WE}$, and $\overline{OE}$ signals are low active signals. However, the similar description applies to a case where a period from the rising edge of the CLK to the rising edge thereof is set as one cycle and at least one of the $\overline{CS}$, $\overline{WE}$, and $\overline{OE}$ signals is a high active signal.

As described above, in a system comprising, for example, a CPU and a memory, when the CPU is operated at a high speed, it is necessary to stabilize the signal on the data bus to establish data as quickly as possible. This is particularly highly required when the CPU reads data from the memory.

Next, a description will be given, with reference to an example of a case where the CPU reads data from the memory system by use of a data bus, of a conventional method of quickly stabilizing the signal on the bus when the CPU operates at a high-speed and the bus is driven at a high speed.

In the configuration of FIG. 27, a CPU system 126 is connected to a memory system 127 through an address and control bus 129 and a data bus 128. The data bus 128 is linked with resistors $R_1$ 130 and $R_2$ 131. Each resistor $R_1$ 130 has another end connected to a potential Vcc, whereas each resistor $R_2$ 131 has another end linked with a potential GND. In this system, if the resistors $R_1$ 130 and $R_2$ 131 are not provided, for a CPU read operation, the CPU system 126 has a high input impedance and the data bus line develops a low characteristic impedance of about 30 to 60 ohm; consequently, there appears a large impedance difference. In consequence, a signal reflection takes place at a connecting point between the CPU and the data bus, namely, at a termination point of the data bus, which prevents the signal from being easily stabilized on the data bus line. Conventionally, in order to cope with this disadvantageous situation, the resistors $R_1$ 130 and $R_2$ 131 are provided to lower the impedance at the terminal end of the data bus line to establish an impedance matching thereat. In this specification, these resistors are called terminal processing resistors. In this connection, for the technology of this kind, reference may be made, for example, to pages 451 to 452 of the "Transistor Gijutsu" (Transistor Technology), May, 1985, (CQ Inc.) Furthermore, as a method of representing the terminal processing resistors, there will be employed herebelow a representation method in which the configuration of FIG. 27 is represented as shown in FIG. 28.

However, for example, if a TTL buffer is used as a drive of a signal to be outputted to the data bus, since the bus drive capacity of the buffer has an upper limit, it is impossible to unconditionally reduce the values of resistors $R_1$ and $R_2$. Namely, these values $R_1$ and $R_2$ are restricted by lower limits. For example, if a usual TTL buffer is adopted as the bus driver, the terminal impedance of the bus line cannot be easily set to be equal to or less than 200 ohm. The impedance is still greatly different from the characteristic impedance 30 to 60 ohm of the data bus line. In consequence, the influence of the reflection cannot be completely removed, which prevents the signal to be quickly stabilized on the bus.

On the other hand, in a case where a driver having a greater drive capacity than the TTL buffer is employed, such a driver is expensive and hence the system cost soars. Moreover, the heat dissipation in the driver and the termination processing resistors is increased, which unfavorably necessitates a large power consumption.

SUMMARY OF THE INVENTION

It is therefore an object of the present invention to provide a digital information transmission apparatus and a method of driving a bus for transmitting information of the apparatus in which when a driver having a drive capacity similar to that of a TTL buffer is used to drive a bus, the signal can be quickly stabilized on the bus so as to minimize an error which may be caused by an insufficient data setup time when the signal is read from the bus.

In order to achieve the object above, according to the present invention, there is provided a digital information transmission apparatus including a plurality of information output systems each being associated with a buffer and each having a function to output digital information to an information transmission bus system, an information input system including a buffer having a function to input therein the digital information from the digital information transmission bus system, and a transmission bus system for transmitting the digital information, wherein the apparatus further includes means operative in a bus cycle identical to a bus cycle in which the digital information input system reads digital information, for outputting from the buffers of at least two digital information systems to the digital information transmission bus system information identical to the information read by said digital information input system.

Furthermore, according to the present invention, there is provided a method of driving a bus system for transmitting information of the digital information transmission apparatus in which digital information is outputted from buffers of a plurality of digital information output systems to the information transmission bus system so as to input the digital information via the bus into the buffer of the digital information input system characterized in that in a bus cycle identical to a bus cycle in which the digital information input system reads digital information, information identical to the information read by the digital information input system is outputted from the buffers of at least two digital information systems to the digital information transmission bus system.

In this constitution, in a bus cycle in which a core system having a function to read therein information reads digital information d, at least two output buffers supply the bus with the same digital information d substantially at the same time. When outputting the information, the output impedance of each of these output buffers is decreased.

In consequence, when a plurality of output buffers deliver the same digital information to the bus almost at the same time, there appear a plurality of points on the bus where a matching takes place for a lower output impedance of the output buffers. In consequence, at an occurrence of a switching of an output buffer, the impedance of the bus can be set to be similar to the output impedance of the output buffer. As a result, at the switching point of the output buffer(s), the values of impedance at the respective points of the bus can be uniformly developed. Consequently, the signal on the bus is prevented from being reflected.

Furthermore, when the bus is configured in a form of a ring, the bus does not include any terminal or termination point and the signal reflection can be further prevented on the bus, which enables the signal to be more quickly stabilized on the bus. In addition to the effect of prevention of the signal reflection, according to the present invention, when an information read core system reads digital information d from an information output core system, all the output buffers of the systems outputting the digital information d effect a switching operation such that there is established a state in which two or more buffers having a low output impedance are connected onto the data bus line. In consequence, as compared with the case where only one output buffer performs a switching, the bus drive capacity is enhanced and the period of time required for the signal to rise or fall on the bus line is minimized.

BRIEF DESCRIPTION OF THE DRAWINGS

FIGS. 21 and 22 are explanatory diagrams useful to explain an effect associated with a termination resistance in the eighth embodiment according to the present invention;

DESCRIPTION OF THE PREFERRED EMBODIMENTS

First Embodiment

Figure 1:
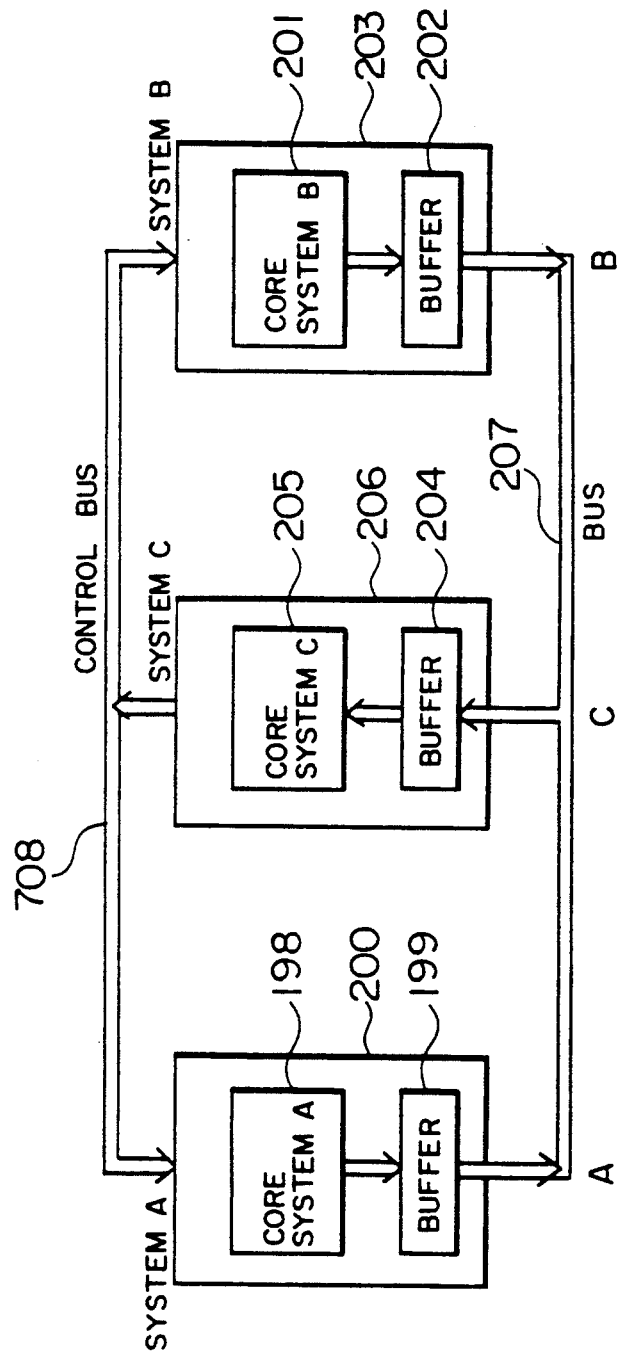
FIG. 1 is a schematic diagram showing a first embodiment according to the present invention.

FIG. 1 shows the first embodiment according to the present invention.

This embodiment includes a system A 200, a system B 203, a system C 206, a bus 207, and a control bus 708. The system A 200 comprises a core system A 198 having a function to output digital information and an output buffer 199, the system B 203 includes a core system B 201 having a function to output digital information and an output buffer 202, and the system C 206 comprises a core system C 205 having a function to input digital information and an input buffer 204. The respective systems are connected to each other by means of the bus 207 and the control bus 708. A core system here indicates a system having a function to input or to output necessary information. The core systems each includes, for example, a CPU and a memory system.

The term "core system" to be used herebelow is defined as above.

The bus 207 is connected to the output buffers 199 and 202 and an input buffer 204. A connection point C between the bus 207 and the input buffer 204 exists between a connection point A between the output buffer 199 and the bus 207 and a connection point B between the output buffer 202 and the bus 207.

Figure 4:
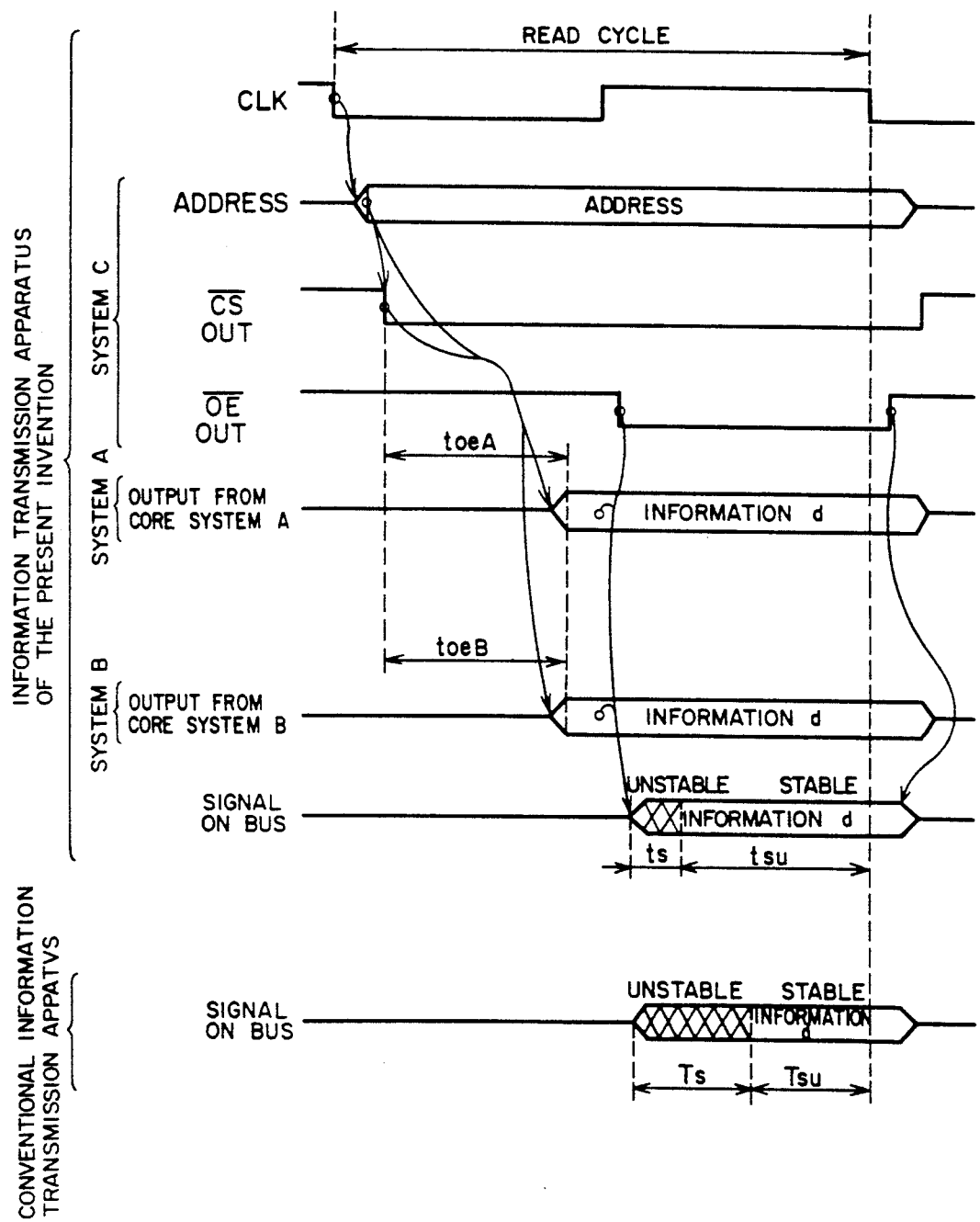
FIG. 4 is a timing chart of signals in the first embodiment.

In this system, digital information d is supplied from the systems A 200 and B 203 to the system C 206 as shown in the signal timing chart of FIG. 4.

In a bus cycle (a read cycle shown in FIG. 4) in which the system C 206 reads the digital information d, a signal (Address signal in FIG. 4) indicating a location where the same digital information d exists in the systems A 200 and B 203 and a signal ($\overline{CS}$ OUT signal in FIG. 4) to control the core systems A 198 and B 201 to respectively output information to the output buffers 199 and 202 are outputted from the system C 206 via the control bus 708 to the system A 200 and B 203. The same digital information d is supplied from the core system A 198 to the output buffer 199 (an output from the core system A shown in FIG. 4) and from the core system B 201 to the output buffer 202 (an output from the core system B shown in FIG. 4) respectively when toeA and toeB are elapsed after the $\overline{CS}$ OUT is set to an LO level. Next, according to a signal ($\overline{OE}$ OUT signal in FIG. 4) instructing to output the same digital information d inputted to the respective output buffers 199 and 202 onto the bus 207, the same digital information d is outputted from the respective output buffers 199 and 202 onto the bus 207 substantially at the same time within the bus cycle in which the system C 206 reads the digital information d (a signal on the bus in the information transmitting apparatus according to the present invention shown in FIG. 4).

In this operation, when the output buffers 199 and 202 output the same digital information d, the output impedance is low, for example, 20 to 30 ohm in a case of a usual TTL output buffer. On the other hand, the characteristic impedance of the data bus line is about 30 to 60 ohm and has a tendency to decrease when the load is increased. In this embodiment, when the output buffers undergo a switching, there appear two locations where a matching takes place for a low output impedance of the output buffers; in consequence, the impedance of the bus line at the point where the output buffers are switched can be set to be quite similar to the output impedance of the output buffers. With this provision, at the point where the output buffers undergo the switching, the impedance values at the respective points of the bus can be uniformly developed. Moreover, since the buffer 199 and the buffer 202 on the bus line are subjected to the switching substantially at the same time in the bus cycle identical to the information read cycle of the system C 206, there can be dynamically established an impedance matching at the connection points between the buffers 199 and 202 and the bus line.

As a result, in this system, since the signal reflection can be minimized on the bus 207, it is possible to prevent the signal on the bus from being disturbed by an influence of the reflection and to quickly stabilize the signal o the bus.

Furthermore, when the system C 206 reads information from the systems A 200 and B 203, both of the buffers 299 and 202 connected to the bus 207 undergo a switching, which establishes a state where two buffers having a low output impedance are connected to the data bus. Consequently, as compared with a case where only one output buffer is switched, the bus drive capacity is increased in this case and the period of time required for the signal on the bus to rise or to fall is reduced.

Owing to the effect above, in accordance with the information transmission apparatus of the embodiment and the method thereof, in an information read operation of the system C 206, the period of time (ts shown in FIG. 4) required from when the information signals are outputted from the systems A 200 and B 203 to the bus 207 to when the information signals are stabilized can be reduced as compared with the conventional example (Ts shown in FIG. 4).

In consequence, the period of time (tsu shown in FIG. 4) to be elapsed from when the signal of the digital information d is stabilized on the bus 207 to when the read cycle in which the system reads the digital information d on the bus is terminated can be elongated as compared with the conventional example (Tsu shown in FIG. 4).

The read error which may be caused, because the information signal necessary for the system C 206 becomes unstable at an information read operation of the system C 206 due to the inductance, the capacitance, the reflection, etc. of the bus 207 and the setup time necessary for the system C 206 is not satisfied, can be greatly minimized for the reason above in this embodiment as compared with the conventional example.

Furthermore, in this embodiment, output buffers are adopted as the buffers 199 and 202 and an input buffer is used as the buffer 204; however, these buffers need only be any buffers which send information in the directions shown in the figure at least during the period in which the system C 206 reads information from the system A 200 and the system B 203. These buffers may be bidirectional buffers which send information to another direction during the other periods.

According to this embodiment, the impedance of the bus at a point of time when the output buffers undergo a switching can be set to be similar to the output impedance of the output buffers. This enables uniform development of the impedance at each point of the bus 207 at the point when the output buffers are switched. Consequently, as shown in an example of FIG. 19, when the termination or terminal processing is achieved by use of registers $R_1$ 309 to $R_4$ 312, even if the registers $R_1$ 309 to $R_4$ 312 take greater values as compared with the conventional example, a satisfactory bus stabilizing effect can be attained. In this case, there is obtained an effect that the heat dissipation of the termination processing resistors is minimized as compared with the conventional example.

Figure 19:
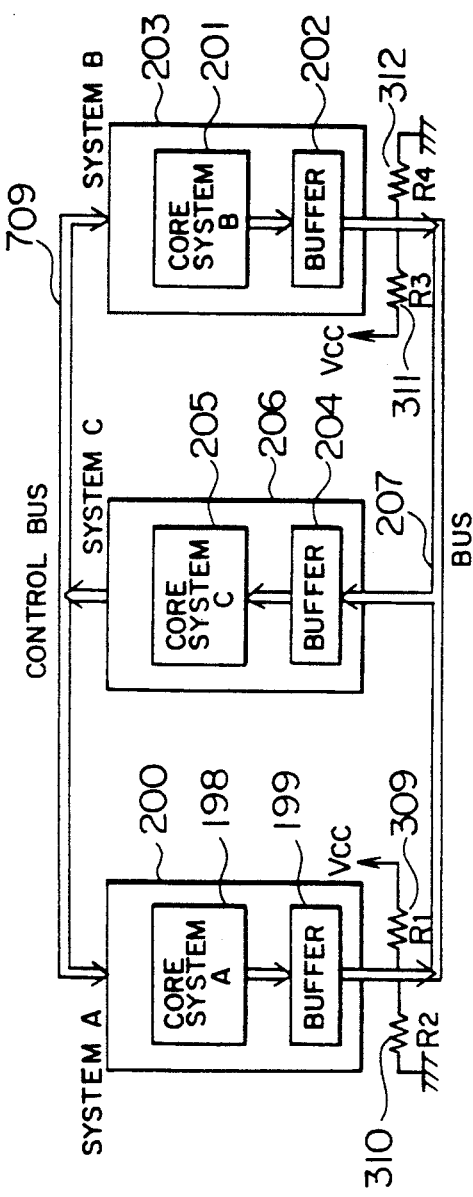
FIGS. 19 and 20 are explanatory diagrams useful to explain an effect associated with a termination resistance in the first embodiment according to the present invention.
Figure 20:
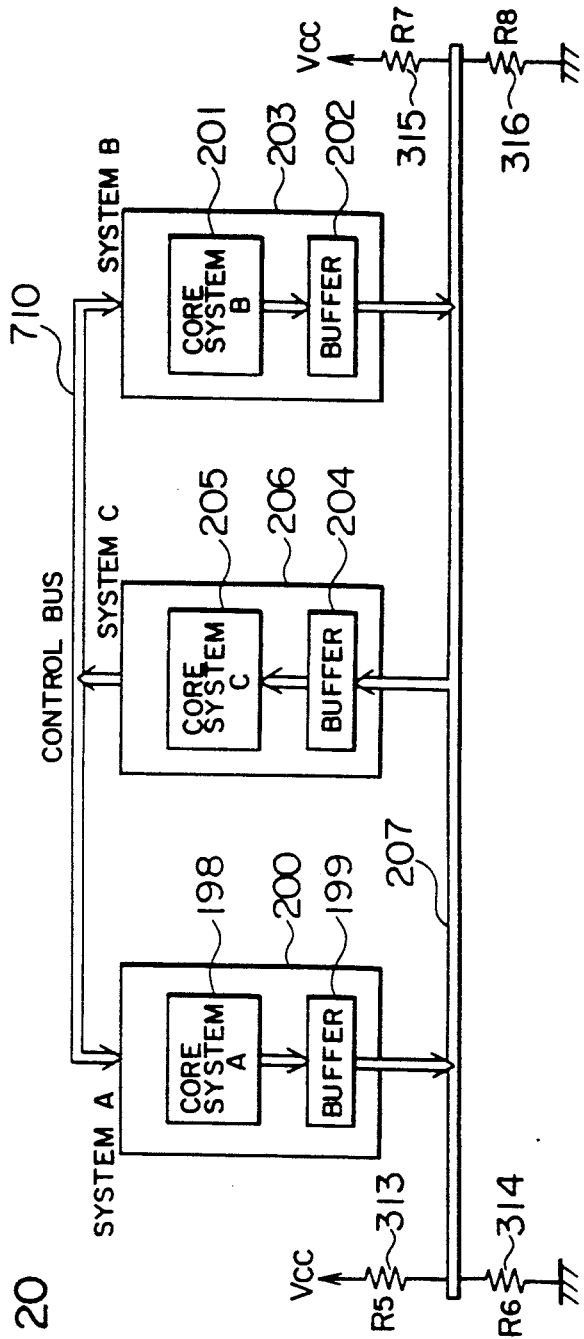

Moreover, an example in which the bus of the embodiment shown in FIG. 19 is extended so as to connect termination processing resistors to the extended portions is shown in FIG. 20. In this example, in an operation when the system C 206 reads digital information from the systems A 200 and B 203, in order to stabilize the signal on the bus as quickly as in the case of the embodiment shown in FIG. 19, the values of the termination processing registers $R_5$ 313 to $R_8$ 316 are required to be smaller than those of the termination processing registers $R_1$ 309 to $R_4$ 312 shown in FIG. 19. In the embodiments of FIGS. 19 and 20, since the bus is driven by two buffers, the bus drive capacity is increased. In consequence, the values of the termination processing registers $R_5$ 313 to $R_8$ 316 can be set to be smaller than those of the termination processing registers $R_1$ 309 to $R_4$ 312. Namely, also in the embodiment shown in FIG. 20, in a case where the system C 206 executes a read operation for digital information from the systems A 200 and B 203, there is attained an effect that the signal on the bus can be quickly stabilized.

A balance drive method referred to herebelow is a method, as shown in this embodiment, in which at substantially the same time within the bus cycle in which the digital information read system reads digital information, digital information identical to the digital information read by the information read system is outputted from each of output buffers of a plurality of digital information output systems to the bus so as to quickly stabilize the digital information on the bus.

The next second embodiment is an application example of the first embodiment.

Second Embodiment

Figure 2:
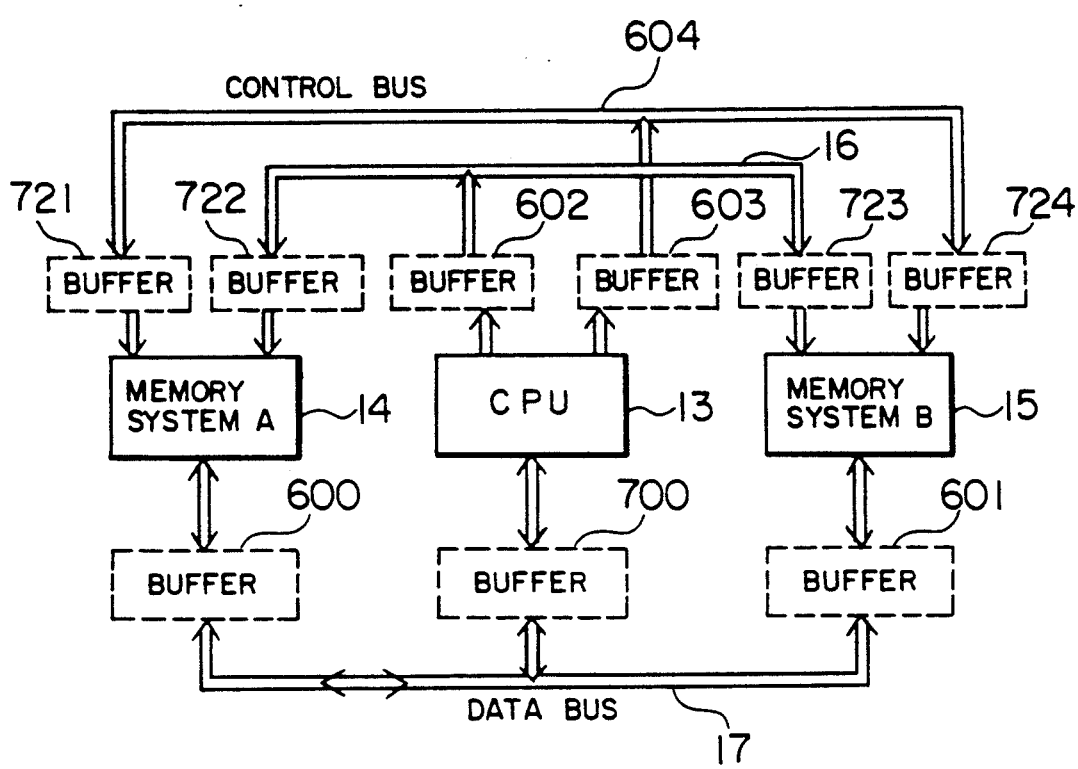
FIGS. 2 and 3 are diagrams showing a second embodiment according to the present invention.

FIG. 2 shows the second embodiment in accordance with the present invention. The embodiment shown in FIG. 2 includes a CPU 13, a memory system A 14, a memory system B 15, an address bus 16, a control bus 604, buffers 600 to 603, 700, and 721 to 724, and a data bus 17. The CPU 13 has an address signal line connected via the buffer 602 to the address bus 16. The memory system A 14 and the memory system B 15 respectively have address signal lines connected respectively via the buffers 722 and 723 to the address bus 16. The CPU 13 has a control signal line(s) connected via the buffer 603 to the control bus 604. The memory system A 14 and the memory system B 15 respectively have control signal line(s) connected respectively via the buffers 721 and 724 to this control bus 604. The memory systems A 14 and B 15 respectively possess data signal lines connected respectively via the buffers 600 and 601 to the data bus 17. Connected to the data bus 17 between the connecting point between the buffer 600 and the data bus 17 and the connecting point between the buffer 601 and the data bus 17 is a data signal line of the CPU 13 via the buffer 700. Of these components, the system may be constituted without using the buffers 602 and 603. In addition, the buffers 600, 721 and 722, the buffers 601, 723, and 724, and the buffers 700, 602, and 603 may be disposed in the memory system A 14, the memory system B 15, and the CPU 13, respectively.

This embodiment is implemented based on the first embodiment such that a memory system A 14 is selected for the core system A 198, a memory system B 15 for the core system B 201, a CPU 13 for the core system C 205, a data bus 17 for the bus 207, a control bus 604 and an address bus 16 for the control bus 708.

Figure 3:
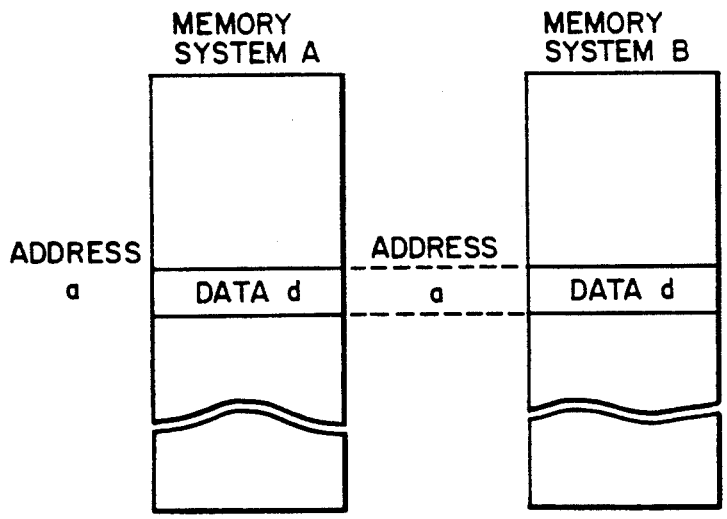

In this second embodiment, the CPU 13 reads data from the memory systems A 14 and B 15 as follows. In the second embodiment, since the memory systems A 14 and B 15 are connected to the same address bus 16 and the same control bus 604, an address employed by the CPU 13 to write digital data d in the memory systems A 14 and B 15 is, as shown in FIG. 3, the same address a in the memory system A 14 as well as in the memory system B 15. In consequence, when the CPU 13 reads out data d, the CPU 13 outputs an address a onto the address bus 16 and a necessary control signal for a selection of the memory systems A 14 and B 15 onto the control bus 604.

As a result, the data d is outputted from the memory system A 14 and the memory system B 15 to the buffers 600 and 601, respectively. Based on an instruction from the CPU 13, the same data d is then outputted from the buffers 600 and 601 to the data bus 17 substantially at the same time in the bus cycle identical to the bus cycle in which the CPU 13 reads the data d.

In consequence, for the similar reason as that of the first embodiment, at a point of time when the buffers 600 and 601 are switched, the impedance at each point of the data bus 17 can be uniformly developed. Consequently, the signal reflection on the data bus 17 can be further suppressed as compared with the conventional example. Moreover, for the similar reason to that of the first embodiment, the period of time required for the signal to rise or to fall on the bus line is reduced.

Owing to the effects above, in accordance with this embodiment, it is possible to minimize the period of time required in a read operation of the CPU 13 from when the digital data is outputted from the memory systems A 14 and B 15 onto the data bus 17 to when the data signal is stabilized.

The read error which may be caused, because the digital data necessary for the CPU 13 becomes unstable at an information read operation of the CPU 13 due to the inductance, the capacitance, the reflection, etc. of the data bus 17 and the setup time necessary for the CPU 17 is not satisfied, can be greatly minimized for the reason above in this embodiment as compared with the conventional example.

In this embodiment, the description has been given of a case where the device to read data from the bus is a CPU. However, this device may be a processor or a system of it. In addition, any units to read data from the bus other than those above, for example, an I/O controller may be used, namely, if the system is configured in a similar fashion to that of this embodiment, the similar effect to that of this embodiment can be attained.

Moreover, although the device to output a signal to the bus in this embodiment is a memory system as an example to output the signal onto the data bus, any system other than the memory system may be used to output a signal to the bus, and the output device may also be a device other than the memory system.

Figure 23:
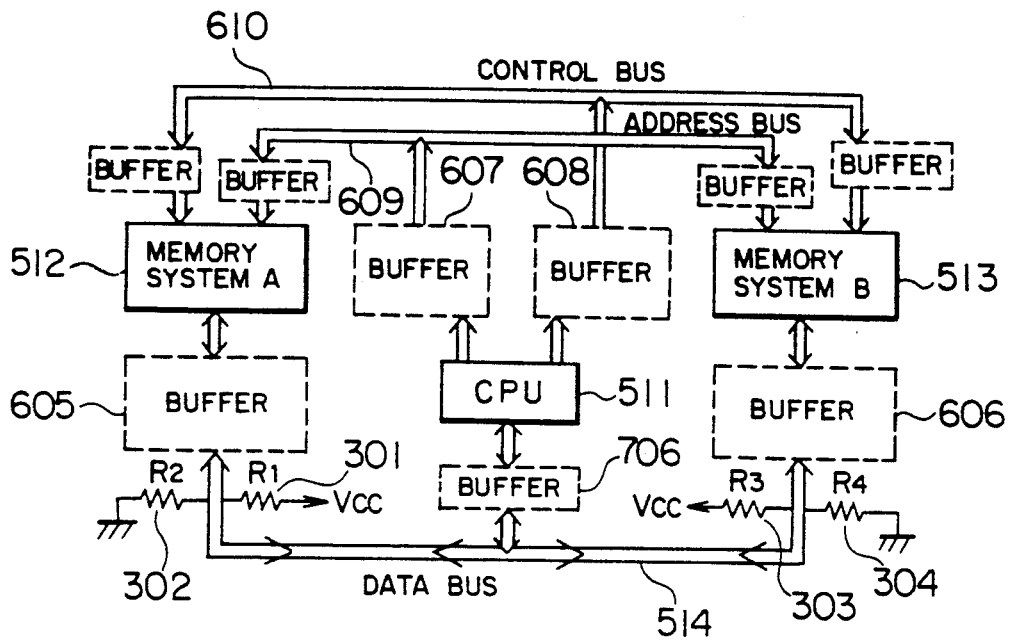
FIGS. 23 and 24 are explanatory diagrams useful to explain an effect associated with a termination resistance in the second embodiment according to the present invention.

In this embodiment, the impedance of the bus at a point of time when the buffers 600 and 601 are switched can be set to be similar to the output impedance of the output buffers. This enables the impedance at each point of the data bus 17 to be uniformly developed when the buffers 600 and 601 are switched. Consequently, as shown in the example of FIG. 23, when the termination processing is achieved by use of the resistors $R_1$ 301 to $R_4$ 304, even if the resistors $R_1$ 301 to $R_4$ 304 take larger values as compared with the conventional example, a satisfactory bus stabilizing effect can be attained. In this case there is obtained an effect that the heat dissipation of the termination processing resistors can be reduced as compared with the conventional example.

Figure 24:
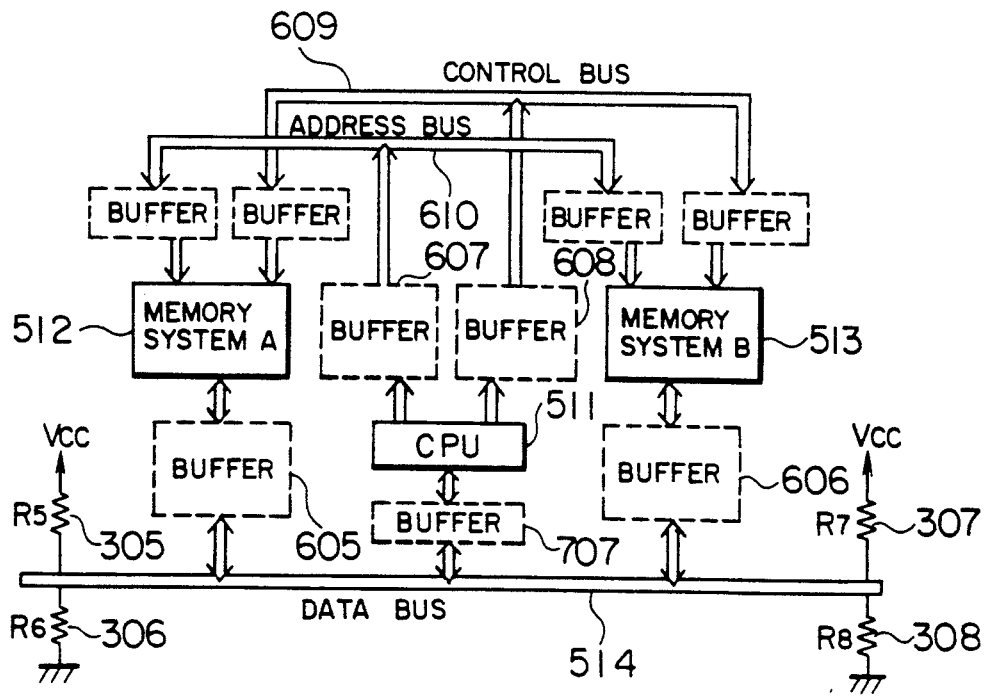
Figure 25:
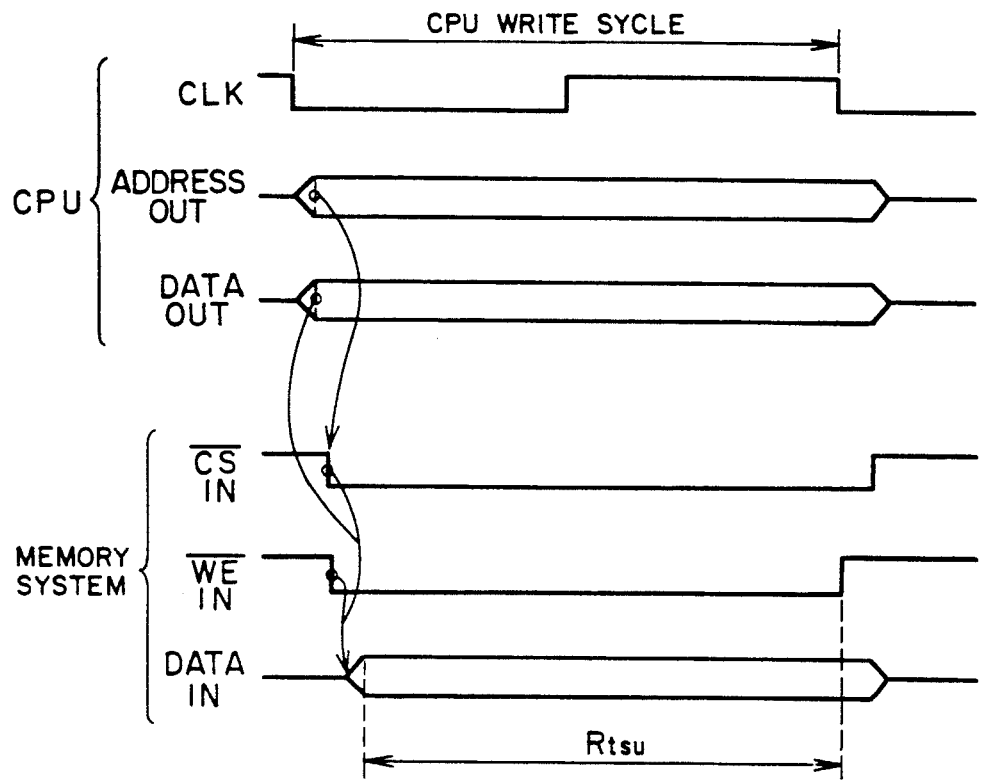
FIG. 25 is an explanatory diagram for explaining a data setup time in the CPU write operation according to the prior art technology.
Figure 26:
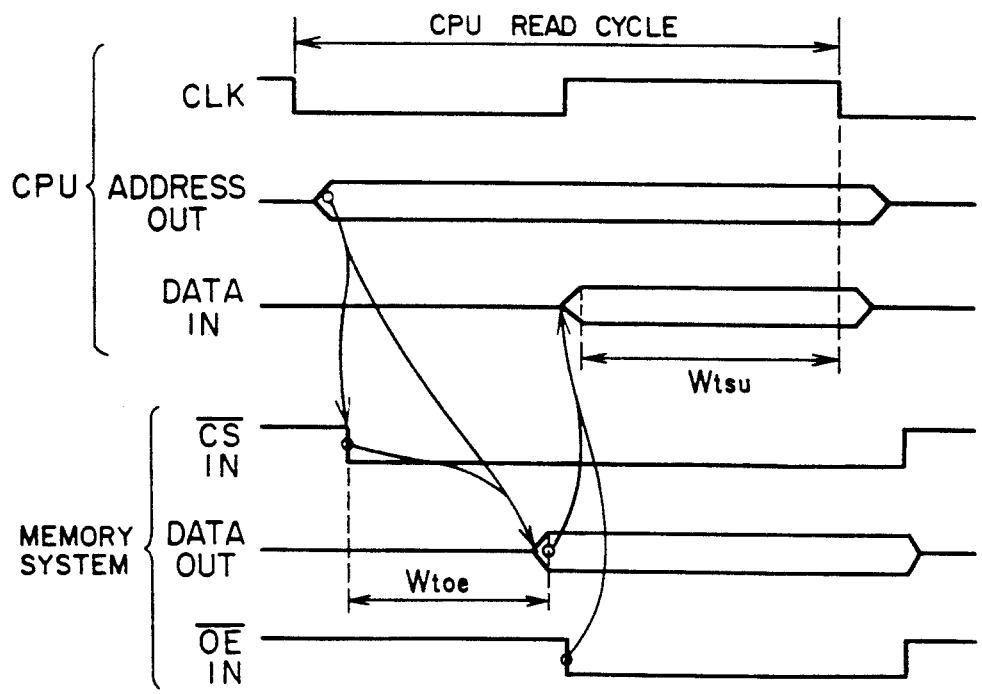
FIG. 26 is an explanatory diagram for explaining a data setup time in the CPU read operation according to prior art technology.
Figure 27:
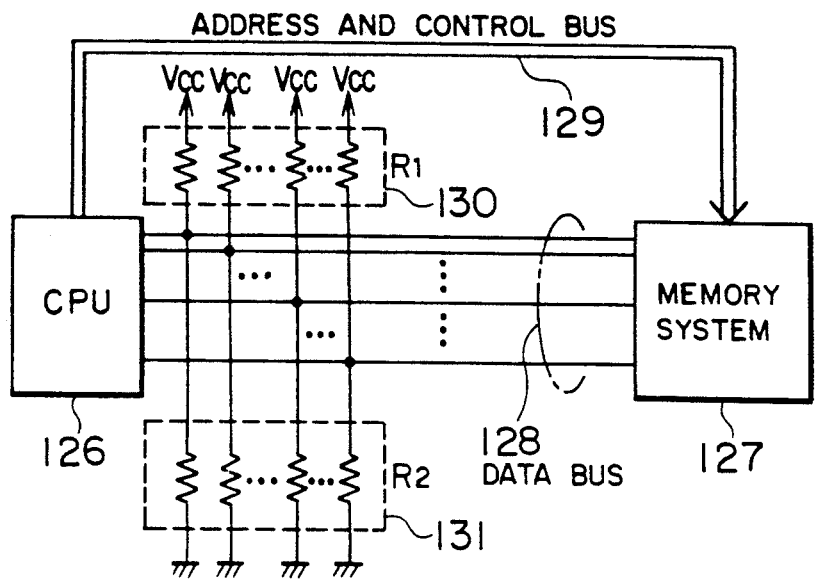
FIGS. 27 and 28 are schematic diagrams showing an example of a method of stabilizing a signal on a bus for transmitting digital information according to prior art technology.
Figure 28:
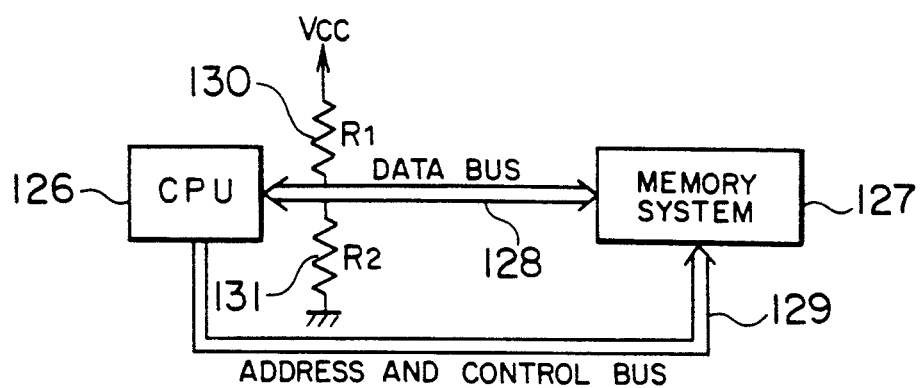

Furthermore, an example in which the data bus of the system of FIG. 23 is elongated so as to connect termination processing resistors to the extended portions is shown in FIG. 24. In this example, in a case where a CPU 511 reads data from memory systems A 512 and B 513, in order to stabilize the signal on the data bus as quickly as in the case of the system shown in FIG. 23, the values of termination processing resistors $R_5$ 305 to $R_8$ 308 are required to be smaller than those of the termination processing resistors $R_1$ 301 to $R_4$ 304 above. In the systems shown in FIGS. 23 and 24, since the bus is driven by two buffers, a large bus drive capacity is developed. In consequence, the values of the termination processing resistors $R_5$ 305 to $R_8$ 308 shown in FIG. 24 may be set to be smaller than those of $R_1$ 301 to $R_4$ 304. That is, also in the embodiment shown in FIG. 24, in a case where the CPU 511 reads data from the memory systems A 512 and B 513, there is obtained an effect that the signal can be quickly stabilized on the data bus.

The method of the termination processing of the example shown in FIG. 23 or 24 is applicable to any embodiments, which will be described herebelow, so as to obtain the similar effect as that of this second embodiment.

Third Embodiment

Figure 5:
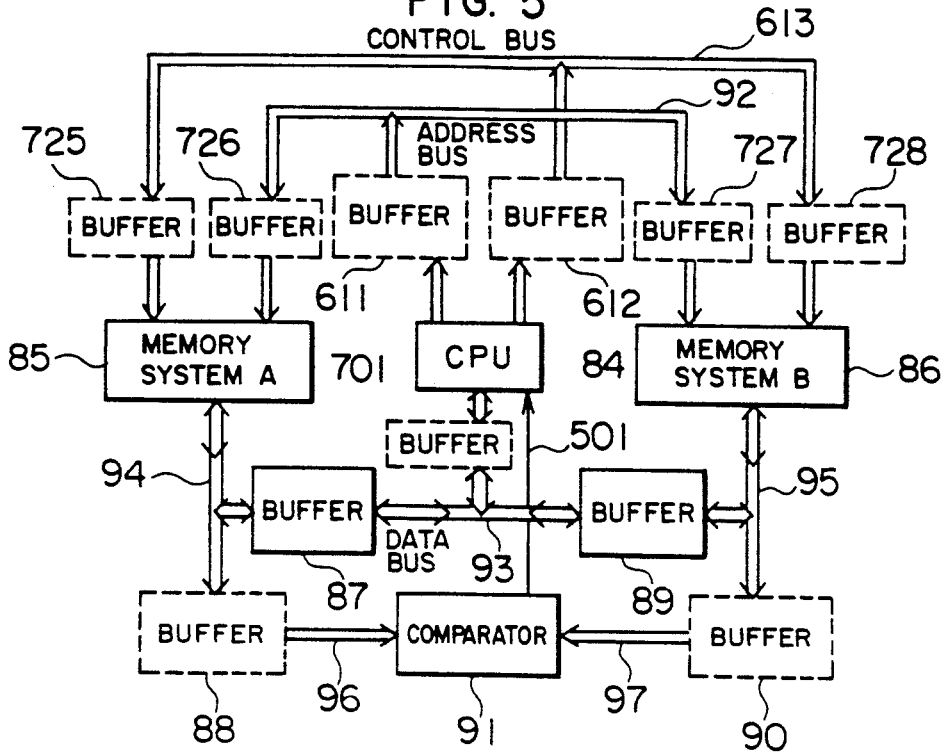
FIG. 5 is a schematic diagram showing a third embodiment according to the present invention.

FIG. 5 shows the third embodiment according to the present invention. The third embodiment is implemented by adding to the second embodiment the following devices.

Namely, a data bus A 94 is connected via a buffer 88 and a bus 96 to a comparator 91, whereas a data bus B 95 is connected via a buffer 90 and a bus 97 to the comparator 91. Moreover, the comparator 91 is connected via a signal line(s) 501 to a CPU 84.

In this system, the CPU 84 achieves a read operation similar to that of the first embodiment and offers the similar effect to that of the first embodiment.

Furthermore, in the system of this embodiment, all bits of digital data outputted from the memory system A 85 onto the data bus A 94 are sent via the buffer 88 and the bus 96 to the comparator 91, whereas all bits of digital data outputted from the memory system B 86 onto the data bus B 95 are sent via the buffer 90 and the bus 97 to the comparator 91.

The comparator 91 compares all bits of the data sent from the memory system A 85 via the bus 96 with all bits of the data sent from the memory system B 86 via the bus 97 so as to notify a result of the comparison via a signal line(s) 501 to the CPU 84. If the result indicates an unmatching condition, the CPU 84 may execute again the read operation. As described above, in this embodiment, in a case where a read error occurs in a read operation from the memory system, there is minimized a chance to read the wrong data, which leads to an effect that the CPU read error due to an insufficient data setup time is reduced. In addition, there is attained an effect to minimize a read error of the CPU 84 due to a wrong operation of the memory system. In this configuration, the buffers 88 and 90 may be dispensed with.

The description has been given of a case where a CPU is employed as a device to read digital data from the bus; however, any device other than the CPU which device reads digital data from the bus may be employed. Also in such a case, the effect similar to that of this embodiment can be obtained by constructing the system in the similar fashion as for this embodiment.

Furthermore, in this embodiment, a memory system outputting a signal onto the data bus is adopted as a device to supply a signal onto the bus; however, if there is used a system which outputs a signal onto the bus, the bus may be any bus other than the data bus. The output device may be any device other than the memory system. Also in such a case, the effect similar to that of this embodiment can be obtained by constructing the system in the similar fashion as for this embodiment.

Fourth Embodiment

Figure 6:
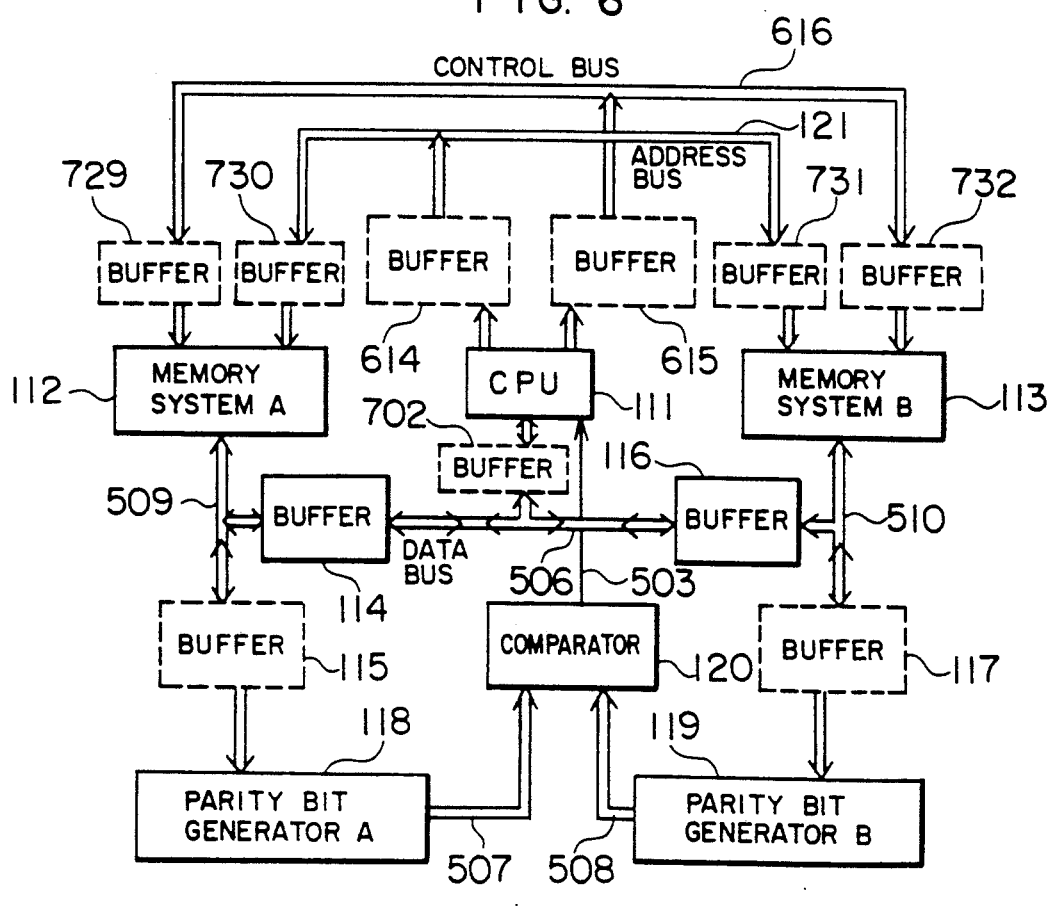
FIG. 6 is a diagram showing a fourth embodiment according to the present invention.

FIG. 6 shows the fourth embodiment according to the present invention. The fourth embodiment is implemented by adding to the second embodiment the following devices. Namely, a data bus A 509 is connected via a buffer 115 to a parity bit generator A 118, which produces an output to be inputted via a signal line(s) 507 to a comparator 120.

A data bus B 510 is connected via a buffer 117 to a parity bit generator B 119, which produces an output to be inputted via a signal line(s) 508 to the comparator 120. The comparator 120 compares two parity bits inputted via the signal lines 507 and 508 to notify a result of the comparison via a signal line 503 to a CPU 111.

In a system described above, an operation of the CPU 111 to read digital data from the memory system is similar to that of the first embodiment and offers an effect similar to that of the first embodiment. Moreover, in contrast to the third embodiment in which the comparator 91 compares all bits between the digital data read from the memory system A 85 and digital data read from the memory system B 86, the comparator 120 of this embodiment does not compare all bits between the data read from the memory system A 112 and the data read from the memory system B 113. Namely, the comparison is accomplished between the parity bit(s) respectively generated from the parity bit generators A 118 and B 119 so as to report a result of the comparison to the CPU 111. As a method of producing parity bit(s), there has been a method in which the parity bit(s) is/are generated by use of the number of bits at a High state in the data. Although a read error detection rate in the memory system read operation is decreased in the case of the comparison of the parity bits when compared with that of the method of the third embodiment in which all bits of data are compared, since the memory system read error takes place in most cases in only one bit of the data, it is still possible to detect many read errors by use of this method to prevent an influence of the errors from being propagated.

In addition, as compared with the method of the third embodiment, according to this method, the number of the signal lines 507 and 508 connected to the comparator can be minimized. In a case where these signal lines are wired on a circuit board, the limited space of the board can be advantageously utilized in an effective fashion.

The description has been given of a case where a CPU is employed as a device to read data from the bus; however, any device other than the CPU which device reads digital data from the bus may be employed. Also in such a case, the effect similar to that of this embodiment can be obtained by constructing the system in the similar fashion as for this embodiment.

Furthermore, in this embodiment, a memory system outputting a signal onto the data bus is adopted as a device to supply a signal onto the bus; however, if there is used a system which outputs a signal onto the bus, the bus may be any bus other than the data bus. The output device may be any device other than the memory system. Also in such a case, the effect similar to that of this embodiment can be obtained by constructing the system in the similar fashion as for this embodiment.

Fifth Embodiment

Figure 7:
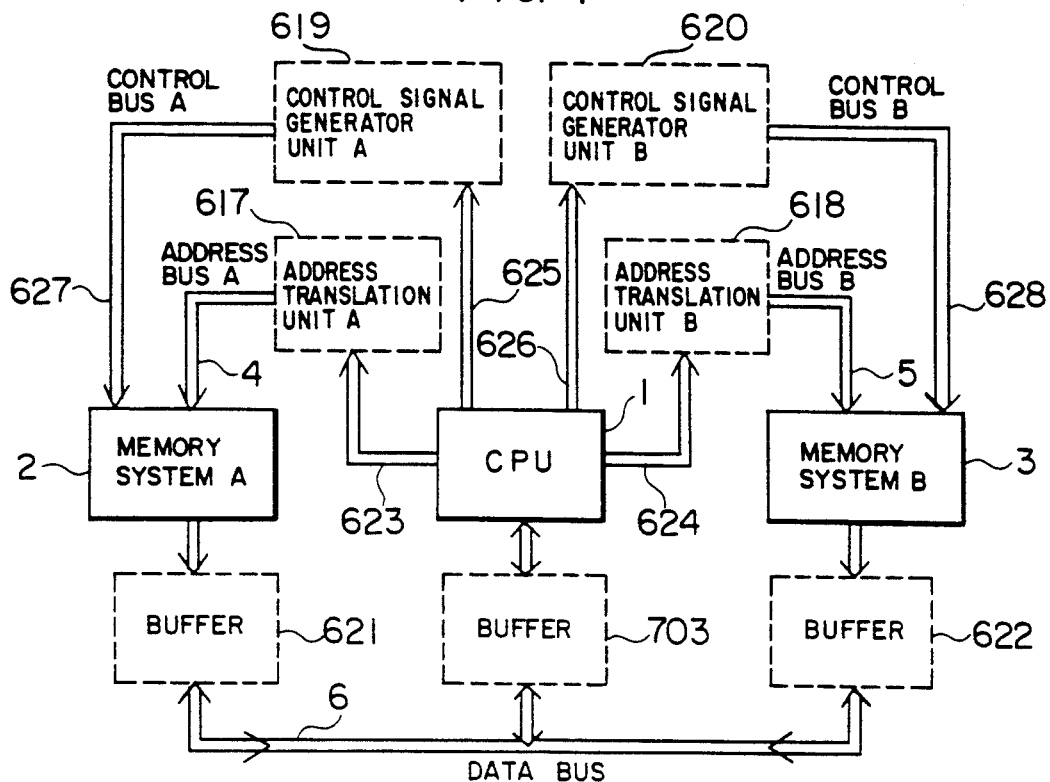
FIGS. 7 and 8 are schematic diagrams showing a fifth embodiment according to the present invention.

FIG. 7 shows the fifth embodiment according to the present invention. In this embodiment, the address bus and the control bus of the second embodiment are disposed independently for the memory system A and the memory system B.

Namely, the system of this embodiment includes a CPU 1, a memory system A 2, a memory system B 3, buffers 621, 622, and 703, a data bus 6, an address translation unit A 617, an address translation unit B 618, an address bus A 4, an address bus B 5, a control signal generator unit A 619, a control signal generator unit B 620, a control bus A 627, and a control bus B 628.

An address output from the CPU 1 is connected via a signal line(s) 623 to the address translation unit A 617, whereas an address output from the address translation unit A 617 is connected via the address bus A 4 to an address input of the memory system A 2. Similarly, an address output from the CPU 1 is connected via a signal line(s) 624 to the address translation unit B 618, whereas an address output from the address translation unit B 618 is connected via the address bus B 5 to an address input of the memory system B 3. Data line(s) of the memory system A 2 is/are connected via the buffer 621 to the data bus 6, whereas data lines of the memory system B 3 are connected via the buffer 622 to the data bus 6. Furthermore, data lines of the CPU 1 are connected via the buffer 703 to the data bus 6. A control signal(s) of the CPU 1 is/are connected via a signal line(s) 625 to the control signal generator unit A 619, whereas a control signal output created by the control signal generator unit A 619 is/are connected via the control bus A 627 to the memory system A 2. Similarly, a control signal(s) of the CPU 1 is/are connected via a signal line(s) 626 to the control signal generator unit B 620, whereas a control signal output(s) created by the control signal generator unit B 620 is/are connected via the control bus B 628 to the memory system B 3.

In the system shown in FIG. 7, the CPU 1 reads digital data from the memory system as follows.

Figure 8:
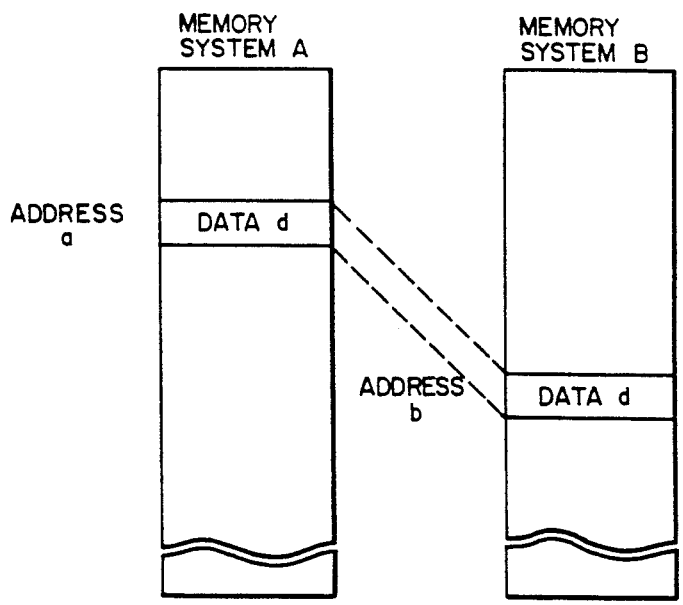

First, in the fifth embodiment, an address c outputted from the CPU 1 when the CPU 1 writes digital data in the memory system is sent via the signal line(s) 623 to the address translation unit A 617 so as to be translated therein into an address a for a write operation at the address a in the memory system A 2. Furthermore, the address c outputted from the CPU 1 is sent via the signal line(s) 624 to the address translation unit B 618 so as to be translated therein into an address b for a write operation at the address b in the memory system B 3. This is shown in FIG. 8. Control signal(s) necessary for the write operation to be supplied to the memory system A 2 and the memory system B 3 is/are respectively produced by the control signal generator unit A 619 and the control signal generator unit B 620 based on a control signal(s) outputted from the CPU 1 so as to be supplied via the control bus A 627 and the control bus B 628 to the memory system A 2 and the memory system B 3, respectively.

In general, the address a may differ from the address b.

Moreover, the addresses supplied from the CPU 1 to the address translation units A 617 and B 618 may be identical to or different from each other. When the CPU 1 reads digital data d, the address signal c outputted from the CPU 1 is, like in the write operation, translated by the address translation unit A 617 into an address a and by the address translation unit B 618 into an address b. Control signals to open the buffers 621 and 622 are supplied from the control signal generator units A 619 and B 620 via the respective control buses A 627 and B 628. In consequence, substantially at the same time within a bus cycle identical to the bus cycle in which the CPU 1 reads data d, like in the case of the timing chart of the first embodiment of FIG. 4, the digital data d is outputted from the memory system A 2 and the same digital data d is outputted from the memory system B 3 respectively via the buffers 621 and 622 to the data bus 6.

Since the output impedance of the buffers and the characteristic impedance of the data bus when the buffers 621 and 622 output the data d are here substantially similar to those of the second embodiment, for the similar reason to that of the second embodiment, the impedance at each point of the bus can be uniformly developed at a point when the buffers 621 and 622 are switched. Consequently, the signal reflection on the data bus 6 can be considerably decreased as compared with the conventional example and the signal can be quickly stabilized on the data bus. Furthermore, in a CPU read operation, when the two buffers connected to the data bus are switched, there is developed a state in which two buffers having a low output impedance are connected to the data bus. In consequence, when compared with a case where only one output buffer undergoes a switching, the bus driving capacity is increased and the period of time required for the signal to rise or fall on the data bus is reduced.

Owing to the effects above, in the system of this embodiment, during a read operation of the CPU 1, the period of time from when data from the memory systems A 2 and B 3 are respectively outputted via the buffers 621 and 622 to when the data signals are stabilized can be minimized as compared with the conventional example.

For the reasons above, as compared with the conventional example, this embodiment leads to a considerable reduction in a read error which may be caused because the data signal necessary for the CPU 1 becomes unstable on the data bus 6 in the data read operation of the CPU 1 due to the inductance, the capacitance, the reflection, etc. of/on the data bus 6 and hence the setup time necessary for the CPU 1 is not satisfied.

In this embodiment, the address translation units A 617 and B 618 and the control signal generator units A 619 and B 620 are omissible. If these components are omitted, an address outputted from the CPU 1 is supplied via the address bus A 617 to the memory system A 2 and via the address bus B 5 to the memory system B 3. A control signal(s) outputted from the CPU 1 is/are supplied via the control bus A 627 to the memory system A 2 and the buffer 621 and via the control bus B 628 to the memory system B 3 and the buffer 622. Furthermore, the buffers 621, 622, and 703 may be disposed in the memory systems A 2 and B 3 and the CPU 1, respectively. The effect to be developed when these components are omitted is similar to the effect to be obtained when these components are employed.

In the description, the device to read data from the bus is a CPU; however, any device other than the CPU which device reads data from the bus may be used. In such a case, the effect similar to that of this embodiment can be attained by constructing the system in a similar manner as for this embodiment.

Furthermore, as a device to output a digital signal to the bus, there is employed a memory system as an example to output a signal to the data bus in this embodiment. However, if a device to output a digital signal to the bus is used, the bus may be any bus other than the data bus. Moreover, the output device may be a device other than the memory system. Also in such a case, if the system is constructed in a similar manner to that of this embodiment, the signal output to the bus can be quickly stabilized and the signal setup margin on the bus is increased, which enables the data to be appropriately read out even when the read device operates at a high speed.

Sixth Embodiment

Figure 9:
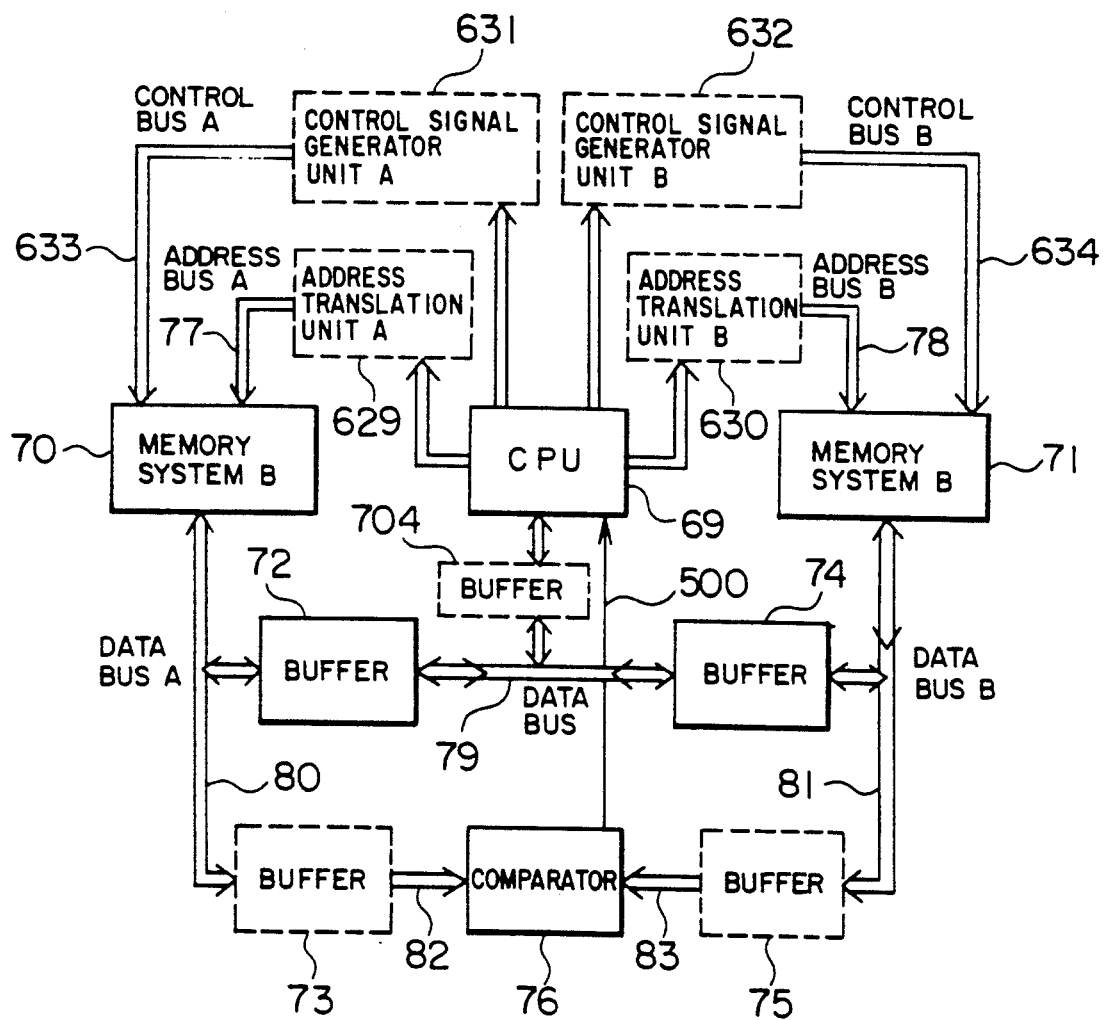
FIG. 9 is a diagram showing a sixth embodiment according to the present invention.

FIG. 9 shows the sixth embodiment according to the present invention. This system is implemented by adding to the fifth embodiment the following devices. Namely, a data bus A 80 is connected via a buffer 73 and a bus 82 to a comparator 76.

In addition, a data bus B 81 is connected via a buffer 75 and a bus 83 to the comparator 76. The comparator 76 is connected via a signal line(s) 500 to a CPU 69.

In this embodiment, the CPU 69 achieves a read operation from a memory system in a similar fashion to that of the fifth embodiment.

In consequence, for the reasons similar to those of the fifth embodiment, in this embodiment, at a data read operation of the CPU 69, the period of time required from when information is outputted from the memory systems A 70 and B 71 via the buffers 72 and 74 onto the data bus 79 to when the information is stabilized can be reduced as compared with the conventional example.

In this embodiment, as compared with the conventional example, there can be greatly reduced read errors which occurs because the digital data signal necessary for the CPU 69 becomes unstable on the data bus 79 in the data read operation of the CPU 69 due to the inductance, the capacitance, the reflection, etc. of/on the data bus and hence the setup time necessary for the CPU 69 cannot be satisfied.

Furthermore, in this system, all bits of data read from the memory system A 70 are sent via the buffer 73 and the bus 82 to the comparator 76, whereas all bits of data read from the memory system B 71 are also sent via the buffer 75 and the bus 83 to the comparator 76. The comparator 76 compares all bits of the data sent from the memory systems A 70 and B 71 so as to notify a result of the comparison via a signal line(s) 500 to the CPU 69. If the result indicates an unmatching condition, the CPU 69 recognizes a read error occurrence and hence may execute again the read operation. Through the operations above, in this embodiment, in addition to the effect that the signal on the data bus is stabilized at a considerably higher speed as compared with the conventional example, increasing the data setup time margin, when an unmatching occurs in the comparison conducted by the comparator 76 on all bits from the data read from both memory systems, the CPU 69 achieves again the read operation, which leads to an effect that the chance to read wrong data is reduced when the CPU reads data from the memory systems.

The description has been given of a case where a CPU is employed as a device to read digital data from the bus; however, any device other than the CPU which device reads digital data from the bus may be employed. Also in such a case, the effect similar to that of this embodiment can be obtained by constructing the system in the similar fashion as for this embodiment.

Furthermore, in this embodiment, a memory system outputting a signal onto the data bus is adopted as a device to supply a signal onto the bus; however, if there is used a system which outputs signal onto the bus, the bus may be any bus other than the data bus. The output device may be any device other than the memory system. Also in such a case, the effect similar to that of this embodiment can be obtained by constructing the system in the similar fashion as for this embodiment.

Seventh Embodiment

Figure 10:
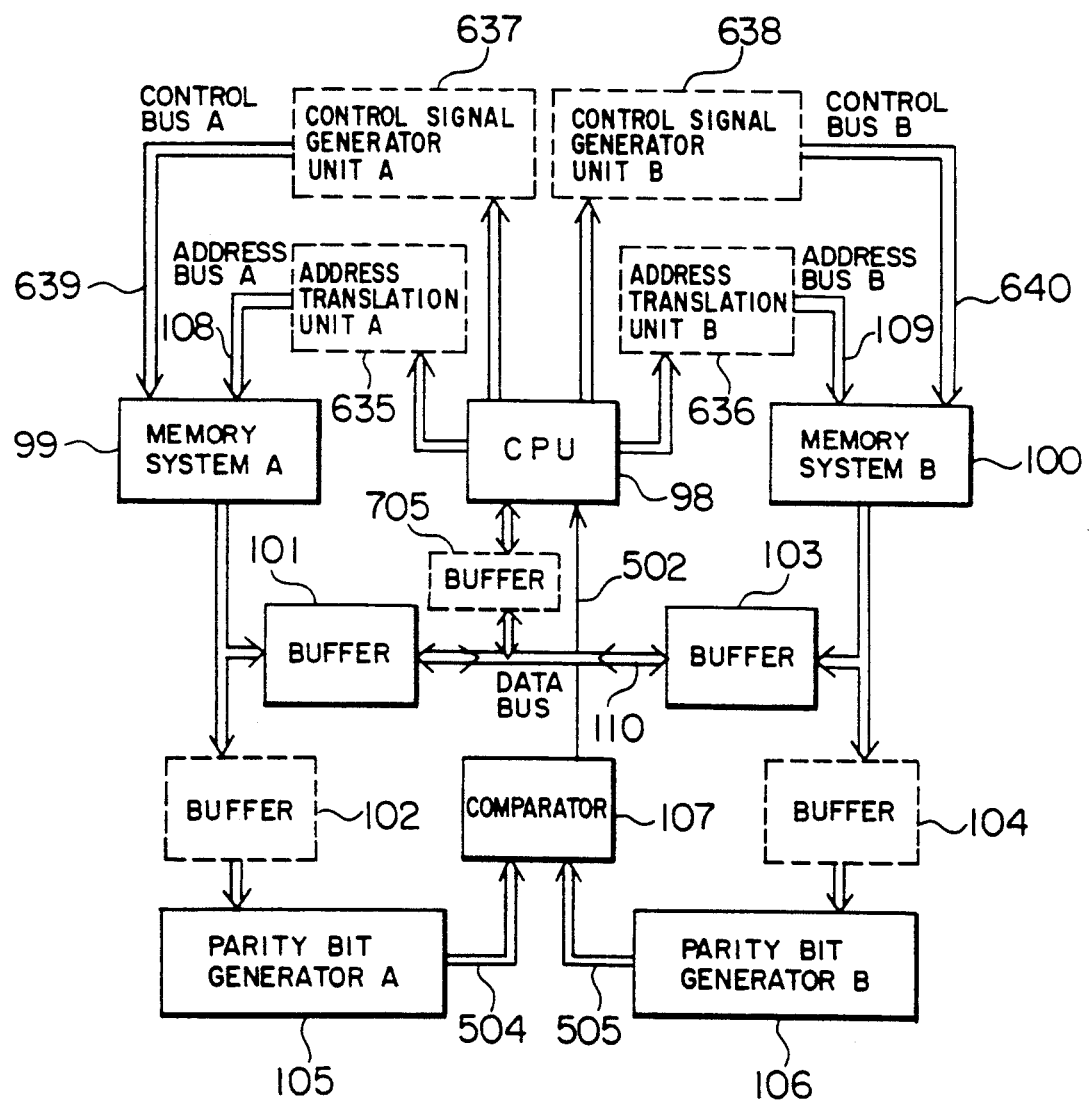
FIG. 10 is a schematic diagram showing a seventh embodiment according to the present invention.

FIG. 10 shows the seventh embodiment according to the present invention. The seventh embodiment is different from the sixth embodiment in the following points.

Namely, in the sixth embodiment, all bits of digital data read from the memory system A are sent via the buffer to the comparator and all bits of digital data read from the memory system B are also sent via the buffer to the comparator such that the comparator compares all bits of both digital data items. In contrast thereto, in the seventh embodiment, all bits of data read from the memory system A 99 are sent via a buffer 102 to a parity bit generator A 105. In the parity bit generator A 105, the inputted data is converted into parity bit(s). For example, an operation is conducted such that the number of bits at the high state in all inputted data is outputted as the parity bit(s). The parity bit data is sent via a signal line(s) 504 to a comparator 107. Furthermore, all bits of data read from the memory system B 100 are sent via a buffer 104 to a parity bit generator B 106. In the parity bit generator B, the inputted data is converted into parity bit(s) in a similar fashion as for the parity bit generator A. The parity bit(s) is/are sent via a signal line(s) 505 to the comparator 107.

The comparator 107 compares the parity bits sent from the parity bit generator A 105 with those sent from the parity bit generator B 106 to notify a result of the comparison to a CPU 98.

When the comparison result indicates an unmatching, the CPU 98 may conduct again the read operation so as to reduce errors in the read operation on the memory system. In this check method using parity bits, a comparison on all bits as in the sixth embodiment is not performed, and hence the error detection rate is reduced as compared with the sixth embodiment. However, since the read error occurs only in one bit of the data in many cases, for example, the parity bit check method above in which the number of bits at the high state in the data is adopted as the parity bits can also detect most of the read errors to prevent the propagation of the influence thereof.

As described above, when the parity bit generators are employed to compress data, the number of signal lines 504 and 505 can be minimized as compared with the bus widths of the buses 82 and 83 of FIG. 9, thereby efficiently using the space on the board, which is limited when wrings of the signal lines 504 and 505 are conducted thereon.

Furthermore, the provision of the buffers 101 and 103 on the data bus 110, like in the case of the sixth embodiment, enables the signals on the data bus to be stabilized at a considerably higher speed as compared with the conventional example. Moreover, also in a high-speed operation of the CPU 98, like in the case of the sixth embodiment there is developed an effect that the read errors of the CPU 98 occurring because the setup time necessary for the CPU 98 cannot be satisfied for the read data of the CPU 98 is minimized as compared with the conventional example.

In addition, in the case of this embodiment, the read error of the CPU in a read operation from the memory system is detected by use of signal lines the number of which is smaller as compared with the sixth embodiment so as to notify the error to the CPU, which leads to an effect that the read errors in the read operations from the memory system is reduced.

The description has been given of a case where a CPU is employed as a device to read digital data from the bus; however, any device other than the CPU which device reads digital data from the bus may be employed. Also in such a case, the effect similar to that of this embodiment can be obtained by constructing the system in the similar fashion as for this embodiment.

Furthermore, in this embodiment, a memory system outputting a signal onto the data bus is adopted as a device to supply a signal onto the bus; however, if there is used a system which outputs a signal onto the bus, the bus may be any bus other than the data bus. The output device may be any device other than the memory system. Also in such a case, the effect similar to that of this embodiment can be obtained by constructing the system in the similar fashion as for this embodiment.

Eighth Embodiment

Figure 11:
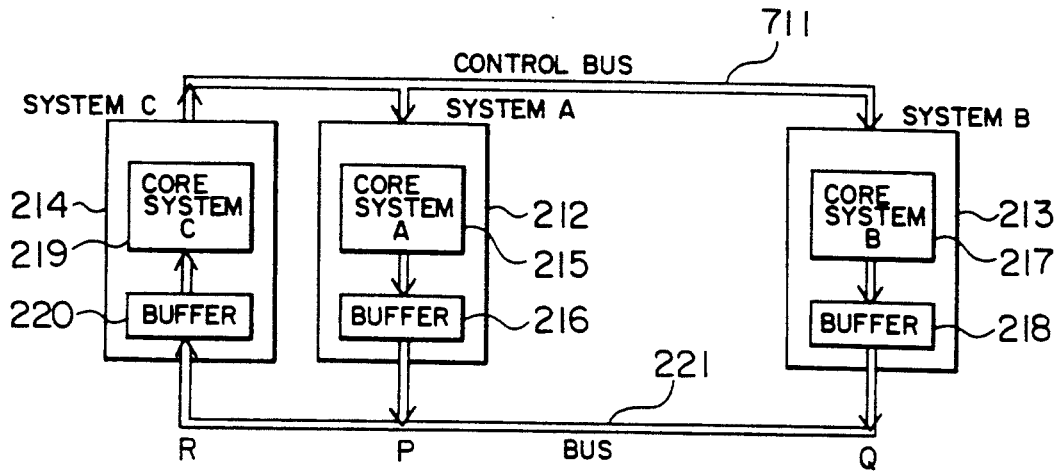
FIG. 11 is a diagram showing an eighth embodiment according to the present invention.

FIG. 11 shows the eighth embodiment according to the present invention.

This system includes a system A 212, a system B 213, a system C 214, a bus 221, and a control bus 711. The system A 212 comprises a core system A 215 and an output buffer 216, the system B 213 comprises a core system B 217 and an output buffer 218, and the system C 214 comprises a core system C 219 and an output buffer 220.

The buffers in the respective systems A 212, B 213, and C 214 are connected with each other by use of the bus 221. In addition, a control signal outputted from the system C 214 is supplied via the control bus 711 to the systems A 212 and B 213. Assuming that the system A 212 is connected to the bus 221 at a point P, that the system B 213 is connected to the bus 221 at a point Q, and that the system C 214 is connected to the bus 221 at a point R; the point P is located between the points Q and R on the bus 221. Moreover, each of the core systems A 215 and B 217 has a function to output information, whereas the core system C 219 has a function to input information. Namely, this embodiment is a system in which the system C of the system of the first embodiment is connected to the bus not between the points P and Q but at the point R outside the interval P to Q.

In this embodiment, a certain digital information item d is, like in the first embodiment, sent from the systems A 212 and B 213 to the system C 214, and the effect thereof is also similar to that of the first embodiment.

Namely, in this embodiment, at an information read operation of the system C 214, the period of time from when the digital information is outputted from the systems A 212 and B 213 to the bus 221 to when the digital information is stabilized can be minimized as compared with the conventional example. In consequence, in this embodiment, there is attained an effect to considerably reduce the read errors as compared with the conventional example which are caused because that the digital signal necessary for the system C 214 becomes, at a data read operation of the system C 214, to be unstable on the bus 221 due to the inductance, the capacitance, the reflection, etc. on the bus 221 and hence the setup time necessary for the system C 214 is not satisfied.

In this connection, this effect becomes more remarkable as the bus length between P and R is decreased relative to the bus length between P and Q in FIG. 11. Furthermore, the effect is further enhanced when termination processing resistors $R_1$ 280 and $R_2$ 281 are disposed on the bus 221 (shown in FIG. 11) as shown in FIG. 21. The configuration may be as shown in FIG. 22. In either case, there is developed an advantage similar to that of the example of FIG. 19 or 20 with respect to the first embodiment.

In addition, according to this embodiment, although an output buffer is employed for each of the buffers 216 and 218 and an input buffer is used for the buffer 220, these buffers need only be buffers which send information in the directions shown in FIG. 11 at least during a period of time where the system C reads information from the systems A 212 and B 213 and bidirectional buffers which send information also in another direction during the other period of time.

Ninth Embodiment

Figure 12:
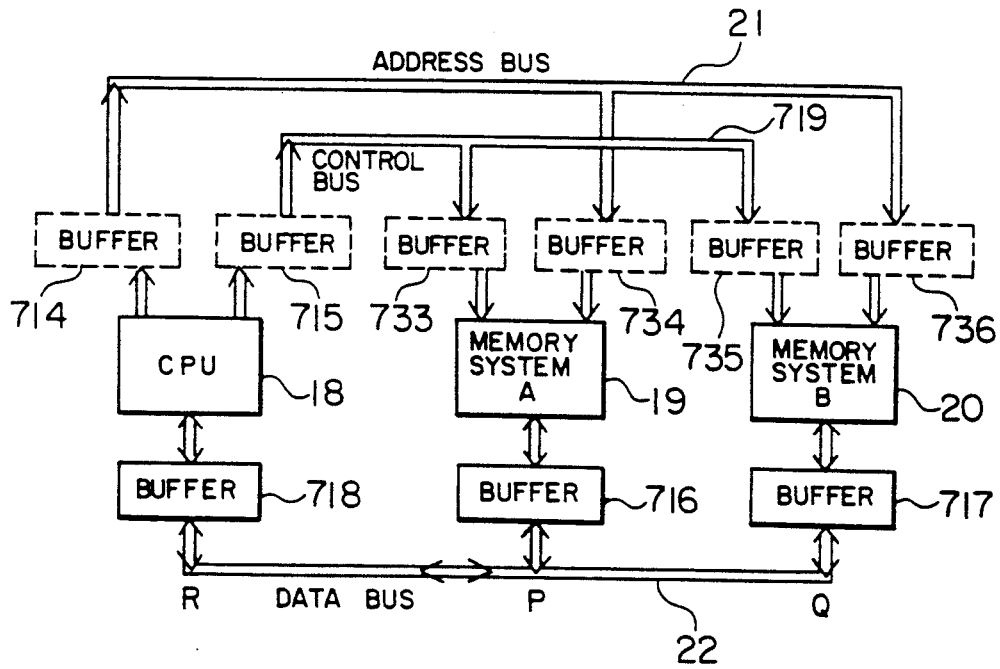
FIG. 12 is a diagram schematically showing a ninth embodiment according to the present invention.

FIG. 12 shows the ninth embodiment according to the present invention. This embodiment is an application example of the eighth embodiment. In the system of the second embodiment shown in FIG. 2, the CPU is connected via a buffer to the data bus between the respective connecting points between the respective memory systems and the data bus. In contrast thereto, in the system of this embodiment, as shown in FIG. 12, assuming that a memory system A 19 is connected via a buffer 716 to a data bus 22 at a point P, that a memory system B 20 is connected via a buffer 717 to the data bus 22 at a point Q, and that a CPU 18 is connected via a buffer 718 to the data bus 22 at a point R; the point P is between the points Q and R on the data bus 22. The other configurations are similar to those of the second embodiment.

In the system above, the CPU 18 reads data from the memory system in the similar fashion as for the second embodiment, which leads to an effect similar to those of the second and eighth embodiments. It is also possible to dispose in the ninth embodiment shown in FIG. 12, like in the third embodiment shown in FIG. 5, a comparator to compare all bits of output digital data from the memory systems A 19 and B 20 to achieve a check, which enables the similar effect as for the third embodiment to be attained. Furthermore, it is also possible to dispose in the ninth embodiment, like in the fourth embodiment shown in FIG. 6, a parity bit generator and a comparator to check by use of parity bits the outputs from the memory systems A 19 and B 20, thereby attaining the similar effect as for the fourth embodiment. Moreover, it is also possible in the system of the ninth embodiment shown in FIG. 12, like in the fifth embodiment shown in FIG. 7, to independently dispose an address bus and a control bus for each memory system so as to obtain the similar effect as for the fifth embodiment. In addition, in a system in which the address and control buses are independently disposed for each memory system in the ninth embodiment, like in the third embodiment, it is also possible to compare all bits of the output from the memory system A with those of the output from the memory system B; furthermore, like in the fourth embodiment, the output from the memory system A and that from the memory system B may be checked by comparing the parity bits.

Tenth Embodiment

Figure 13:
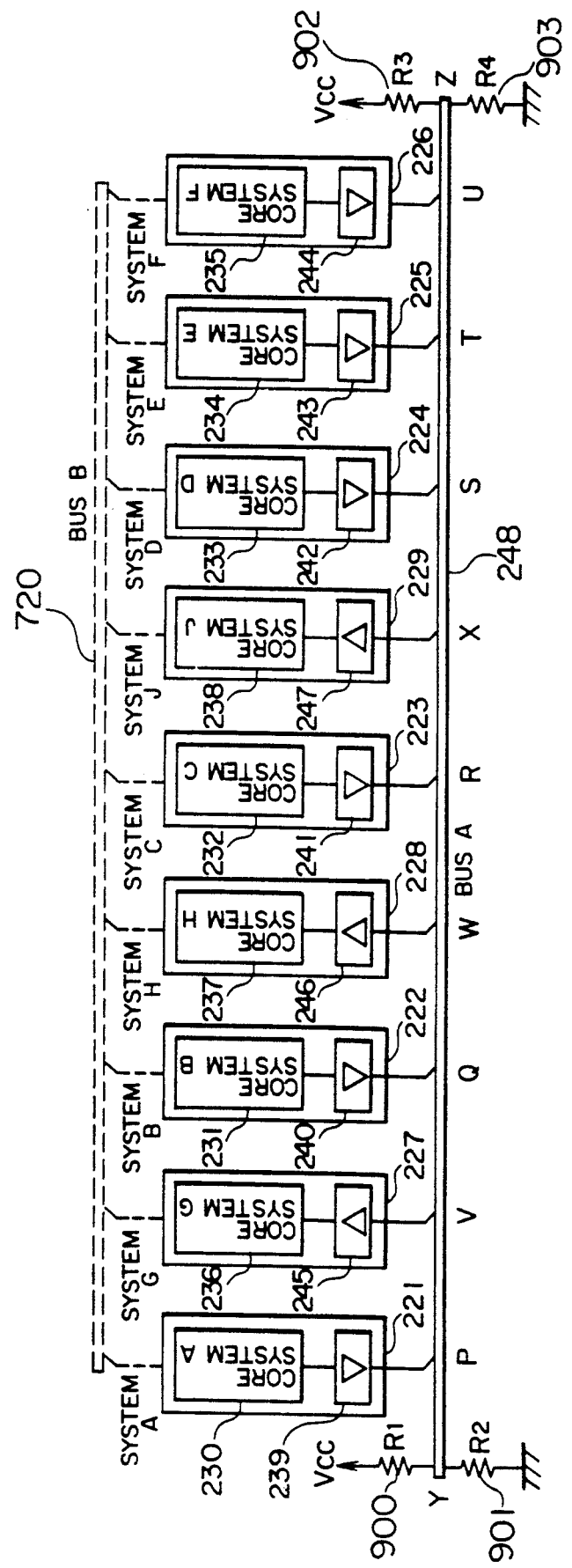
FIG. 13 is a diagram showing a tenth embodiment according to the present invention.

FIG. 13 shows the tenth embodiment according to the present invention.

This embodiment is implemented by combining the first embodiment with the eighth embodiment. This system includes systems A 221 to H 228, a system J 229, a bus A 248, and a bus B 720. Termination processing resistors $R_1$ 900 to $R_4$ 903 may be disposed when necessary.

The systems A 221 to F 226 respectively have core systems A 230 to F 235 each possessing a functions to output digital information and output buffers 239 to 244 each having a function to output inputted digital information to a bus. Systems G 227, H 228, and J 229 respectively have core systems G 236, H 237, and J 238 each possessing a function to input (read) digital information and input buffers 245, 246, and 247 each having a function to output digital information inputted from a bus to an input core system. Here, a core system is a system having a function to input or output necessary information. An example of the core system is a CPU, a memory system, or the like. The core system in each system is respectively connected to a bus 248 via a buffer. Furthermore, the systems A 221 to H 228 and J 229 are connected with each other by means of the bus B 720. Here, let us assume that the connecting points between the systems A 211 to F 226 and the bus A 248 are respectively P, Q, R, S, T, and U and that the connecting points between the systems G 227, H 228, and J 229 and the bus A 248 are respectively V, W, and X. Moreover, both end points of the bus A are assumed to be Y and Z, respectively. In addition, the termination processing may be conducted on the both ends of the bus 248. In this case, there are connected termination processing resistors $R_1$ 900 to $R_4$ 903. The resistance values are, for example, $R_1 = R_3 = 220 \ \Omega$ and $R_2 = R_4 = 330 \ \Omega$. That is, in this system, the systems A 221 to F 226 each have a function to output digital information, whereas G 227, H 228, and J 229 each posses a function to input digital information.

When at least one of the core systems G 236, H 237, and J 238 reads digital information d from the bus A 248, in order that at least two of the core systems A 230 to F 235 each having a function to output digital information for achieving a balance drive respectively output the same digital information d to output buffers connected to the core systems having the digital information output function, address and control signals are respectively sent from the core system reading the digital information via the bus 720 to the digital information output core systems. Furthermore, the same digital information respectively outputted from the digital information output core systems to the output buffers connected thereto is delivered, substantially at the same time within an identical bus cycle when the digital information d of the digital information read core systems is read, from the output buffers to the bus A 248 through the balance drive. In order to allow the digital information reading core systems to read the digital information, a signal controlling the output buffer connected to the core system having the function to output the same digital information d is delivered from the core systems reading the digital information via the bus B 720 to the output buffer. The signal controlling the output buffer may be directly sent to the output buffer from the core system having the digital information reading function or may be produced from the address and control signals fed from the core systems having the information reading function to the core system which is connected to the output buffer and which outputs the information so as to be sent to the output buffer.

In addition, if the signal controlling the information output core systems and the output buffers connected thereto sets substantially at the same time the output buffer to be an output enable sate in a read bus cycle of the information reading core systems so that the same digital information d from the core systems having the information output function is outputted to the bus A 248 substantially at the same time, the signal controlling the output core systems and the output buffers connected thereto may be generated from such a device other than the core systems that has the information read function, for example, from an external device.

In this situation, the respective systems A 211 to H 228 and J 229 need not be connected to each other by means of the bus B 720.

In the tenth embodiment according to the present invention shown in FIG. 13, in the bus cycle in which the core systems having an information reading function read the digital information d, at least two output buffers deliver substantially at the same time the same digital information d to the bus A 248. The output impedance of each of the output buffers decreases at an output operation and is about 20 to 30 $\Omega$ in a case of a general TTL output buffer. On the other hand, the characteristic impedance of the bus is about 30 to 60 $\Omega$ and is likely to decrease when a load connected to the bus increased.

Consequently, in the digital information transmission bus driving method according to the present invention in which a plurality of output buffers output the same digital information to the bus, there appear a plurality of points on the bus A 248 which have an impedance identical to the lower output impedance of the output buffers. In consequence, it is possible to set the impedance of the bus at an instantaneous point when the output buffers conduct a switching to be similar to the output impedance of the output buffers. As a result, the impedance can be uniformly developed at each point of the bus at an instantaneous point of the switching.

In consequence, the signal reflection on the bus A 248 can be further suppressed as compared with the conventional example. Beside the effect of the suppression of the reflection, in this embodiment, when the digital information reading core systems read the digital information d from the digital information outputting core systems, the output buffers of a plurality of cores outputting the digital information d conduct the switching operation so as to establish a sate where two or more buffers having the low output impedance are connected to the data bus line. Consequently, comparing with a case where only one output buffer effects the switching, the bus drive capability is increased and the signal rise and fall times on the bus line are minimized.

Thanks to the effects above, in the system of this embodiment, in a bus cycle in which the digital information reading core system(s) reads information, the period of time from when the information is outputted from the digital information outputting core systems via the output buffers to the bus A 248 to when the information is stabilized can be reduced as compared with the conventional example.

In summary, owing to the reasons above, this embodiment can considerably reduce the read errors as compared with the conventional example which are caused because the information signal necessary for the digital information reading core system becomes to be unstable due to the inductance, the capacitance, the reflection, and the like of/on the information read operations of the core system and hence the setup time necessary for the digital information reading core system cannot be satisfied.

In this embodiment, although the buffers 239 to 244 are used for the output buffers and the buffers 245 to 247 are employed for the input buffers, these buffers may be bidirectional buffers which need only deliver information items in the predetermined directions described above when the core systems connected to the buffers input or output the information items and which feed the information items to other direction in other periods of time.

As for the termination processing resistors $R_1$ 900 to $R_4$ 903 of this embodiment, there is attained an effect similar to that developed in the example of FIG. 23 or 24 associated with the second embodiment.

Eleventh Embodiment

Figure 16:
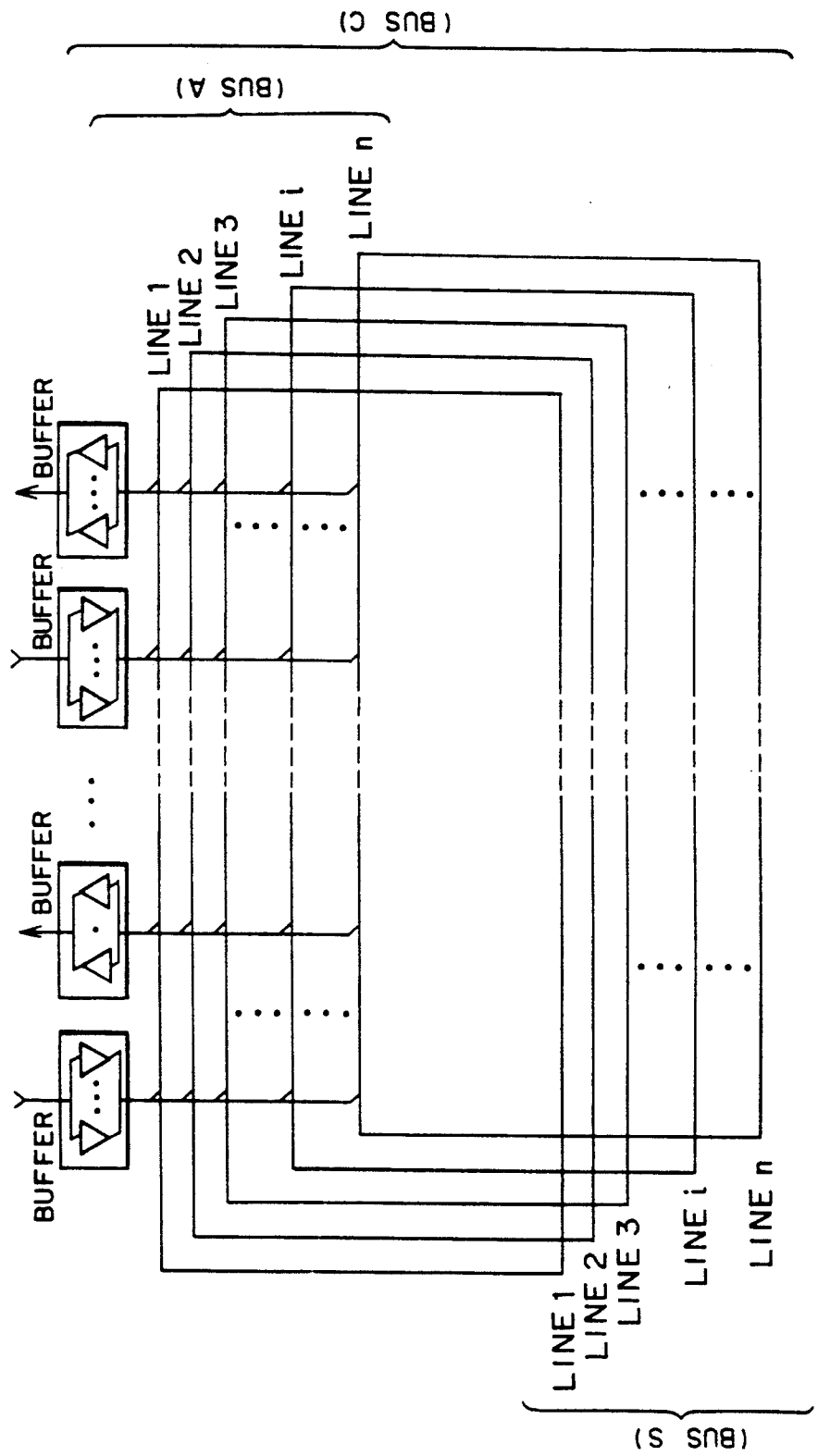
FIG. 16 is a schematic diagram showing a bus in a loop configuration according to the present invention.

In the tenth embodiment according to the present invention shown in FIG. 13, the distance from the point Y to the point R is longer than that from the point Y to the point P, and the distance from the point Z to the point S is longer than that from the point Z to the point U. In consequence, when the system J 229 reads information from the systems C 223 and D 224, it is difficult to sufficiently remove the influence of the reflection at the end point of the bus A 248 as compared with the case where the system H 228 reads information from the systems A 221 and F 226. To overcome this difficulty, in addition to the bus A 248 of the tenth embodiment, a bus S including signal lines the number of which is identical to that of the signal lines of the bus A is disposed such that end points of the respective signal lines constituting the bus A are respectively lined with end points of the respective signal lines forming the associated bus C for each bit line as shown in FIG. 16 so as to create a loop-shaped signal line capable of representing one bit for each bit line and that these lines are collected to form the bus C in a loop shape to suppress the reflection, which implements the eleventh embodiment according to the present invention shown in FIG. 14.

Figure 14:
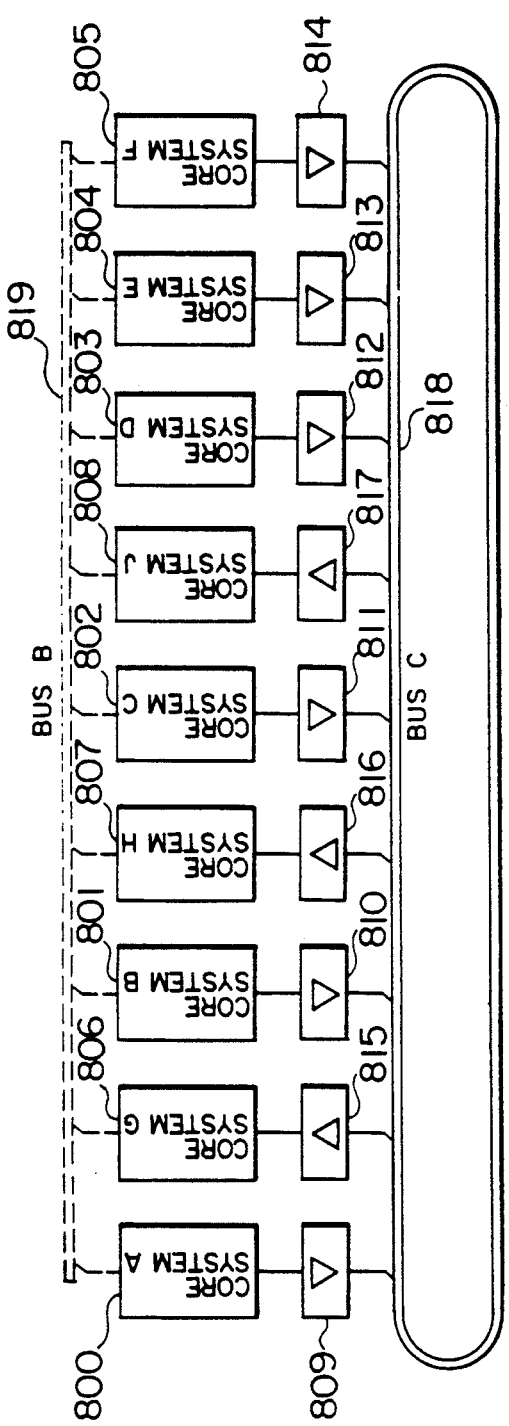
FIG. 14 is a schematic diagram showing an 11th embodiment according to the present invention.

The eleventh embodiment according to the present invention shown in FIG. 14 comprises output buffers 809 to 814, input buffers 815 to 817, core systems A 800 to F 805 having a function to output digital information, core systems G 806, H 807, and J 808 having a function to read digital information, and buses C 818 and B 819. Here, a core system indicates a system having a function to input or to output necessary digital information. An example of the core system is a CPU, a memory system, or the like.

The core systems A 800 to F 805 are respectively connected via the output buffers 809 to 814 to the bus C 818, whereas the core systems G 806, H 807, and J 808 are respectively connected via the input buffers 815 to 817 to the bus C 818. Furthermore, the respective core systems A 800 to H 807 and J 808 are connected to each other via the bus B 819.

When at lest one of the core systems G 806, H 807, and J 808 having a digital information read function reads digital information d, in order that at least two of the core systems A 800 to F 805 having a digital information output function respectively output the same digital information d to the output buffers connected to the core systems having the digital information output function so as to implement the balance drive, address and control signals are respectively sent from the digital information reading core system via the bus B 819 to the digital information outputting core systems. Moreover, in order that the same digital information d respectively outputted from the digital information outputting core systems to the output buffers connected thereto is delivered from the output buffers to the bus C 818 through the balance drive a substantially at the same time within a bus cycle in which the digital information reading core systems read the digital information d so as to be read by the information reading core systems, a signal for controlling the output buffers connected to the core systems having the function to output the same digital information d is sent from the information reading core systems via the bus B 819 to the output buffers. The signal to control the output buffers may be directly sent from the core systems having the information reading function to the output buffers or may be produced from the address and control signals delivered from the core systems having the information reading function so as to be sent to the output buffers.

Furthermore, if the signal(s) controlling the information outputting core systems and the output buffers connected thereto sets the output buffers to the output state substantially at the same time in the read bus cycle of the information reading core systems such that the same digital information d from the core systems having the information output function is outputted to the bus C 818 substantially at the same time, the signal(s) controlling the information outputting core systems and the output buffers connected thereto may be generated from other than the core systems having the information recording function, e.g. from an external device.

In this situation, the core systems A 800 to H 807 and J 808 need not be connected to each other by use of the bus B 819.

In the eleventh embodiment according to the present invention shown in FIG. 14, in the bus cycle in which the core systems having the information reading function read the digital information d, at least two output buffers output the same digital information d to the bus C 818 substantially at the same time. The output impedance of the output buffers is lowered at the output operation and is about 20 to 30 $\Omega$ in a case of the general buffers developing the TTL output. On the other hand, the characteristic impedance of the bus is about 30 to 60 $\Omega$ and is likely to decrease as the load connected to the bus increases.

In consequence, in the digital information transmission bus driving method of the embodiment in which a plurality of output buffers output the same digital information to the bus substantially at the same time, there are produced a plurality of points on the bus C 818 which develop an output impedance identical to the lower output impedance of the output buffers. consequently, it is possible to set the impedance of the bus at an instantaneous point when the output buffers conduct a switching to be similar to the output impedance of the output buffers.

As a result, the impedance at the respective points of the bus can be uniformly developed at an instantaneous point when the output buffers conduct a switching.

In consequence, the reflection of the signal on the bus C 818 can be further suppressed as compared with the conventional example.

Furthermore, according to the embodiment, since the bus C 818 is in a shape of a ring and has not any ends, the reflection of the signal on the bus C 818 can be further suppressed, which enables the signal to be more quickly stabilized on the bus. Beside the effect to suppress the reflection, in this embodiment, when the digital information d is read from the information output core systems, all output buffers of the cores outputting the digital information d undergo a switching such that there is established a state where two or more buffers having the lower output impedance are connected to the data bus line(s). consequently, as compared with the case where only one output buffer conducts the switching, the bus drive capability is increased and the periods of time required for the signal rise and fall operations on the bus line(s) are decreased.

Owing to the effects above, in the system of the embodiment, in the bus cycle in which the digital information reading core systems read information, the period of time to be elapsed from when the information is outputted from the digital information outputting core systems via output buffers to the bus C 818 to when the information is stabilized on the bus C 818 can be reduced.

In summary, in this embodiment, as compared with the conventional example, it is possible to considerably minimize the read errors caused because the information signal necessary for the digital information reading core systems becomes unstable on the bus due to the inductance, the capacitance, the reflection, etc. of/on the bus when the information reading core systems read the information and hence the setup time necessary for the information reading core systems cannot be satisfied.

Twelfth Embodiment

Figure 15:
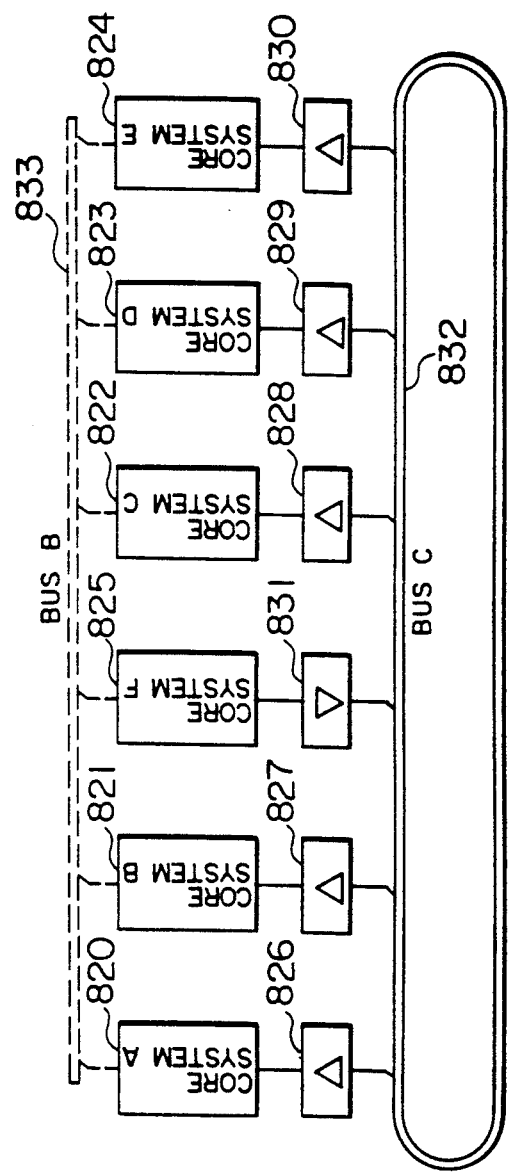
FIG. 15 is a diagram showing a 12th embodiment according to the present invention.

In the eleventh embodiment shown in FIG. 14, two or more information outputting cores outputting the same digital information substantially at the same time when a digital information reading core system reads the digital information d are gathered into one core, thereby implementing the twelfth embodiment of the present invention shown in FIG. 15.

That is, the twelfth embodiment includes input buffers 826 to 830, an output buffer 831, core systems A 820 to E 824 having a function to read digital information, a core system F 831 having a function to output digital information, and buses C 832 and B 833. The core systems A 820 to E 824 are respectively connected via the input buffers 826 to 830 to the bus C 832, whereas the core system F 825 is connected via the output buffer 831 to the bus C 832. Furthermore, the respective core systems A 820 to F 825 are connected to each other via the bus B 833.

When at least one of the core systems A 820 to E 824 having an information reading function reads digital information d outputted from the core system F 825, in response to an instruction from the core system having the digital information reading function, the core system F 825 outputs the digital information d.

Moreover, based on an instruction from the system F 825, the core system having the digital information reading function may achieve the read operation. In this embodiment, since the bus C 832 transmitting the digital information has not any ends, the reflection of the signal can be minimized on the bus A 832 as compared with the case where the bus c 832 is not of a shape of a loop, namely, where the bus has an end point.

Owing to the effects above, in the system of the embodiment, in the bus cycle in which the digital information reading core system reads information, the period of time to be elapsed from when information is outputted from the digital information outputting core system F 825 via the output buffer 831 to the bus C 832 to when the information is stabilized can be reduced as compared with the conventional example.

In summary, in this embodiment, as compared with the conventional example, it is possible to considerably minimize the read error caused because the information signal necessary for the digital information reading core systems becomes unstable on the bus due to the inductance, the capacitance, the reflection, etc. of/on the bus when the information reading core systems read the information and hence the setup time necessary for the information reading core systems cannot be satisfied.

As compared with the methods shown in the tenth and eleventh embodiments, etc. in which the same digital information is outputted from two or more digital information outputting core systems, this embodiment is advantageous in the points that the cost required for the core systems to output the same information in a duplicated fashion is unnecessitated and that the space required for the core systems achieving the duplicated outputs is dispensed with. This embodiment can be employed, for example, when a CPU reads data from a memory or when the CPU writes data in the memory.

Furthermore, the control signal required for the core system having the digital information reading function to read the digital information outputted from the core system F 825 may be supplied from a external system to the core system which achieves the read operation.

In this situation, the respective core systems A 820 to F 825 need not be connected to each other by use of the bus B 833.

Moreover, in the example shown in FIG. 15, only the core system F 825 is a core system which has the digital information outputting function and which is connected via the output buffer to the bus C 832. However, a plurality of core systems which have the digital information outputting function similar to that of the core system F 825 may be connected via the respective output buffers to the bus A 832. In such a situation, an effect similar to this embodiment can be obtained.

Thirteenth Embodiment

Figure 18:
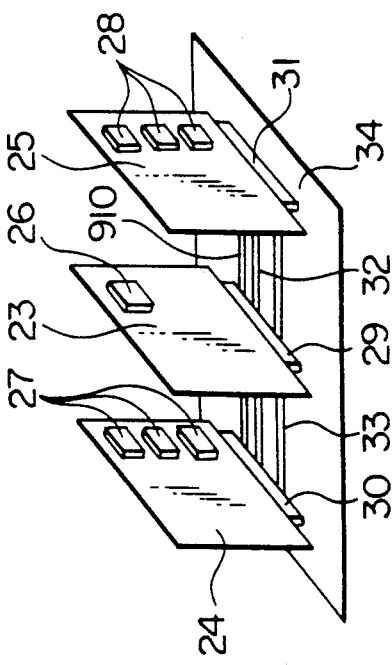
FIG. 18 is a diagram schematically showing a 13th embodiment according to the present invention.

FIG. 18 shows the thirteenth embodiment of the present invention. The system of this embodiment includes a CPU board 23, a memory board A 24, a memory board B 25, and a mother board 34. Mounted on the CPU board 23 is a CPU 26. A memory system A 27 is installed on the memory board A 24, and a memory system B 28 is mounted on the memory board B 25. Address terminals and control terminals of the CPU 26 and the memory systems A 27 and B 28 are respectively connected by use of address bus control bus(es) in the boards and an address bus 32 and a control bus 910 on the mother board 34. Data terminals of the CPU 26 and the memory systems A 27 and B 28 are respectively connected by means of data bus(es) in the boards and a data bus 33 on the mother board 34.

This is equivalent to a system in which the system C of the first embodiment is arranged on the CPU board 23, the system A is installed on the memory board A 24, and the system B is arranged on the memory board B. In consequence, owing to the same reason as that described in the first embodiment, an effect similar to that of the first embodiment is obtained. Namely, there is attained an effect that the data setup time margin is increased when the CPU 26 reads digital data from the memory system and that even when the CPU 26 operates at a high speed, the CPU read errors due to an insufficient data setup time can be minimized.

When the termination processing resistors $R_5$ 313 to $R_8$ 316 as shown in FIG. 20 are attached to the data bus 33, the signal on the data bus can be more quickly stabilized to obtain a high effectiveness. In such a situation, there is attained an advantage similar to that of the example of FIG. 23 or 24 with respect to the second embodiment.

Here, in this description, the device to read digital data from the bus is a CPU; however, any device other than the CPU, the device reading digital data from the bus, can be used to implement the present invention. Also in such a case, by constituting the system in the similar fashion as for this embodiment, an effect similar to that of this embodiment can be attained.

Moreover, the example of the device to output a signal to the bus is a memory system outputting a signal to a data bus in this embodiment; however, in any device outputting a signal to a bus, the bus may be a bus other than the data bus; furthermore, the output device may be other than the memory system. Also in such a case, by constituting the system in the similar fashion as for this embodiment, an effect similar to that of this embodiment can be attained.

Fourteenth Embodiment

Figure 17:
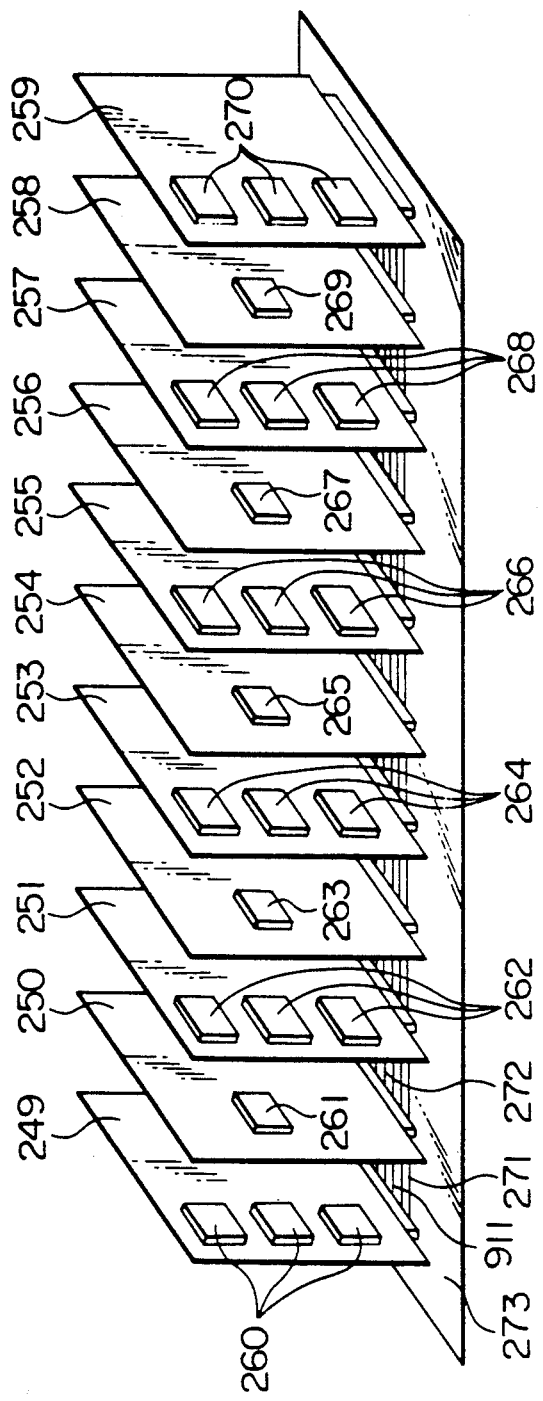
FIG. 17 is a diagram showing a 14th embodiment according to the present invention.

FIG. 17 shows the fourteenth embodiment of the present invention.

The digital information transmission apparatus or transmitter of this embodiment includes CPU boards 250, 252, 254, 256, and 258; memory boards 249, 251, 253, 255, 257, and 259; and a mother board 273.

On the CPU boards 250, 252, 254, 256, and 258, CPUs 261, 263, 265, 267, and 269 are respectively mounted; whereas on the memory boards 249, 251, 253, 255, 257, and 259, memory systems 260, 262, 264, 266, 268, and 270 are respectively arranged.

The respective CPUs and address terminals and control terminals of the memories are connected through the respective buffers by means of address bus(es) and control bus(es) in the respective boards and an address bus 272 and a control bus 911 in the mother board. The respective data terminals are respectively connected to each other by use of the data bus(es) in the respective boards and a data bus 271 in the mother board.

Furthermore, to the data bus 271, there may be attached termination processing resistors like $R_1$ 900 to $R_4$ 903 of FIG. 13.

Since this embodiment is equivalent to a system implemented such that in the tenth embodiment shown in FIG. 13, the system having a function to output digital information is disposed on the memory boards 249, 251, 253, 255, 257, and 259 and the system having a function to input digital information is disposed in the CPU boards 250, 252, 254, 256, and 258; owing to the similar reason as for the case of the tenth embodiment, the similar effect is obtained. That is, when the CPU reads data from the memory, the signal is more quickly stabilized on the data bus as compared with the conventional case to increase the data setup time margin such that even in the high-speed operation of the CPU, there is attained an effect that the CPU read errors caused due to an insufficient data setup time can be reduced.

In this embodiment, although five CPU boards and six memory boards are employed, even when the numbers of the respective boards may be increased or decreased, an effect similar to that of the present invention can be obtained by constituting the system in the entirely similar fashion as for this embodiment.

Furthermore, in the description here, the device that reads digital data from the bus is a CPU; however, any devices other than the CPU which device read digital data from the bus ca be used to implement the present invention. Also in such a case, there can be developed an effect similar to that of the present invention by constituting the system in the similar fashion as for this embodiment.

Moreover, the device that outputs digital signal(s) to the bus is a memory system by way of example which outputs a digital signal(s) to the data bus in this embodiment; however, if there is employed a device to output digital signal(s), any buses other than the data bus may be adopted, and the output device may be other than the memory system. Also in such a case, there can be developed an effect similar to that of the present invention by constituting the system in the similar fashion as for this embodiment.

In accordance with the present invention, in a digital information transmission apparatus, the period of time from when information is outputted from a digital information outputting core system via an output buffer to a bus in a bus cycle in which a digital information reading core system reads the information to when the information is stabilized on the bus can be reduced as compared with the conventional example.

In consequence, according to the present invention as compared with the conventional example, there can be minimized the read errors which are caused because an information signal necessary for the digital information reading core systems becomes unstable due to the inductance, the capacitance, the reflection, etc. of/on the bus when the digital information reading core systems read digital information and hence the setup time necessary for the digital information reading core systems cannot be satisfied. Furthermore, in a case where digital information items outputted from two or more digital information outputting systems in the same bus cycle are compared with each other so as to send a result of the comparison to a core system having an information reading function, there is developed an effect that a read error in a case of an unmatching between the information items can be avoided.

We claim:

1. A digital information transmission apparatus comprising:
   a digital information transmission bus system consisting of a single bus;
   a plurality of digital information output systems each having a buffer which outputs digital information to said single bus;
   a digital information input system having a buffer which inputs digital information from said single bus; and
   means for controlling said digital information input system and said digital information output systems such that in a same bus cycle in which said digital information input system inputs desired digital information, each buffer of at least two of said digital information output systems holding said desired digital information outputs at a same time in said same bus cycle a digital information item identical to said desired digital information to said single bus so that said digital information input system inputs said identical digital information output to said single bus by said buffers of said at least two digital information output systems.

2. A digital information transmission apparatus according to claim 1, wherein:
   said single bus includes signal lines wherein some of said signal lines are each electrically connected in a shape of a loop.

3. A digital information transmission apparatus according to claim 1 or 2 further comprising:
   comparing means for mutually comparing said digital information items outputted at said same time in said same bus cycle from said buffers of said at least two digital information output systems; and
   means for notifying whether a result of the comparison is a coincidence to said digital information input system via control signal lines.

4. A digital information transmission apparatus according to claim 1, wherein on said single bus are disposed resistors at an end thereof for achieving termination processing.

5. An apparatus according to claims 1 or 2 further comprising:
   a comparator; and
   buffers coupled to said comparator, each buffer being further coupled to a respective one of said at least two digital information output systems, for outputting to said comparator further digital information items identical to said desired digital information, wherein said comparator latches said further digital information items in said same bus cycle, compares said latched digital information items with each other and outputs information representative of coincidence or non-coincidence therebetween to said digital information input system and in response to detection of non-coincidence by said comparator, said controlling means is activated so that said digital information input system re-inputs said desired digital information from said at least two digital information output systems through said single bus prior to a next bus cycle.

6. An apparatus according to claims 1 or 2 further comprising:
   at least parity bit generators;
   another buffer, coupled to a respective one of said at least two output systems, for outputting to a respective one of said at least two parity bit generators a digital information item identical to said desired digital information, said respective one parity bit generator generating a parity bit of the identical digital information item; and
   a comparator coupled to said at least two parity bit generators for comparing said parity bits with each other and when the comparison resulted in a coincidence, said digital information items identical to said desired digital information are outputted to said single bus so as to be inputted to said input system prior to a next bus cycle.

7. An apparatus according to claims 1 or 2, further comprising:
   at least two parity bit generators;
   another buffer, coupled to a respective one of said at least two output systems, for outputting to a respective one of said at least two parity bit generators a digital information item identical to said desired digital information, said respective one parity bit generator generating a parity bit of the identical digital information item; and
   a comparator coupled to said parity bit generators for comparing said parity bits with each other and when the comparison resulted in non-coincidence, said controlling means is activated so that said digital information input system re-inputs said desired digital information from said at least two digital information output systems through said single bus prior to a next bus cycle.

8. A method of driving a digital information transmission bus system consisting of a single bus of a digital information transmission apparatus comprising the steps of:
   outputting digital information to said single bus from a plurality of buffers each included in one of a plurality of digital information output systems;
   inputting digital information from said single bus to a buffer included in a digital information input system; and
   controlling said digital information input system and said digital information output systems such that in a same bus cycle, in which said digital information input system inputs desired digital information held in each buffer of at least two of said digital information output systems, digital information items identical to said desired digital information are outputted at a same time in said same bus cycle to said single bus from said buffers of said at least two digital information output systems.

9. A method of driving a digital information transmission bus system consisting of a single bus of a digital information transmission apparatus according to claim 8, further comprising the steps of:

- mutually comparing said digital information items outputted at said same time in said same bus cycle from said buffers of said at least two digital information output systems; and
- notifying whether a result of the comparison is a coincidence to said digital information input system via control signal lines.

10. A method according to claim 8, further comprising the steps of:

- generating further digital information items identical to said desired digital information by further buffers each coupled to a respective one of said at least two output systems;
- latching said further digital information items in a comparator in said bus cycle;
- comparing said further digital information items with each other by said comparator;
- supplying an output of said comparator to said input system; and
- when said output indicates non-coincident, regenerating digital information items identical to said desired digital information and outputting said regenerated digital information items to said single bus.

11. A method according to claim 8, further comprising the steps of:

- generating further digital information items identical to said desired digital information by means of additional buffers each coupled to a respective one of said at least two digital information output systems;
- generating a parity bit from each further digital information item;
- comparing said parity bits with each other; and
- when the comparison indicates non-coincidence, re-inputting, by said digital information input system, said desired digital information from said at least two digital information output systems through said single bus prior to a next bus cycle.

* * * * *